US011224245B2

(12) United States Patent
Essers et al.

(10) Patent No.: US 11,224,245 B2
(45) Date of Patent: Jan. 18, 2022

(54) NON-CHEMICALLY MODIFIED FOOD STARCHES

(71) Applicant: Stichting Wageningen Research, Wageningen (NL)

(72) Inventors: Maurice Karel Hubertina Essers, Hague (NL); Johannes Wouterus Van Groenestijn, Hague (NL)

(73) Assignee: STICHTING WAGENINGEN RESEARCH, Wageningen (NL)

( * ) Notice: Subject to any disclaimer, the term of this patent is extended or adjusted under 35 U.S.C. 154(b) by 351 days.

(21) Appl. No.: 16/341,140

(22) PCT Filed: Oct. 13, 2017

(86) PCT No.: PCT/EP2017/076255
§ 371 (c)(1),
(2) Date: Apr. 11, 2019

(87) PCT Pub. No.: WO2018/069535
PCT Pub. Date: Apr. 19, 2018

(65) Prior Publication Data
US 2020/0138076 A1  May 7, 2020

(30) Foreign Application Priority Data

Oct. 13, 2016  (EP) .................................... 16193765

(51) Int. Cl.
*A23L 29/00* (2016.01)
*A23L 29/212* (2016.01)
*C08B 30/12* (2006.01)

(52) U.S. Cl.
CPC ............ *A23L 29/212* (2016.08); *C08B 30/12* (2013.01); *A23V 2002/00* (2013.01)

(58) Field of Classification Search
None
See application file for complete search history.

(56) References Cited

U.S. PATENT DOCUMENTS

| 5,187,272 A | 2/1993 | Katcher et al. |
| 5,725,676 A | 3/1998 | Chiu et al. |

(Continued)

FOREIGN PATENT DOCUMENTS

| WO | WO-9623104 A1 | 8/1996 |
| WO | WO-2014/042537 A1 | 3/2014 |

OTHER PUBLICATIONS

Stute, "Hydrothermal Modification of Starches: The Difference between Annealing and Heat/Moisture—Treatment", Starch/Starke, Jan. 1, 1976; pp. 205-214.

(Continued)

*Primary Examiner* — Stefanie J Cohen
(74) *Attorney, Agent, or Firm* — Foley & Lardner LLP

(57) ABSTRACT

A process for producing thermally inhibited starch, specifically thermally inhibited non-pregelatinized granular starch, is described, resulting in a viscostable starch product. The process comprising providing an alkaline starch, specifically an alkaline non-pregelatinized granular starch, having a pH of at least 8; subjecting the starch to a hydrothermal treatment, specifically to obtain a hydrothermally treated non-pregelatinized granular starch, said hydrothermal treatment being at a temperature of 45-200° C. with steam at a steam pressure of 0.1-15 bar or a gas mixture comprising water vapor at a partial water vapor pressure of 0.1-1 bar; dehydrating the starch, specifically the hydrothermally treated non-pregelatinized granular starch, to a moisture content of 2 wt % or lower and subjecting the starch to a thermal treatment by heating the starch to a temperature of 120-190° C. to obtain viscostability, cooling and optionally further processing the starch.

13 Claims, 8 Drawing Sheets

(56) References Cited

U.S. PATENT DOCUMENTS

Figure 1A:
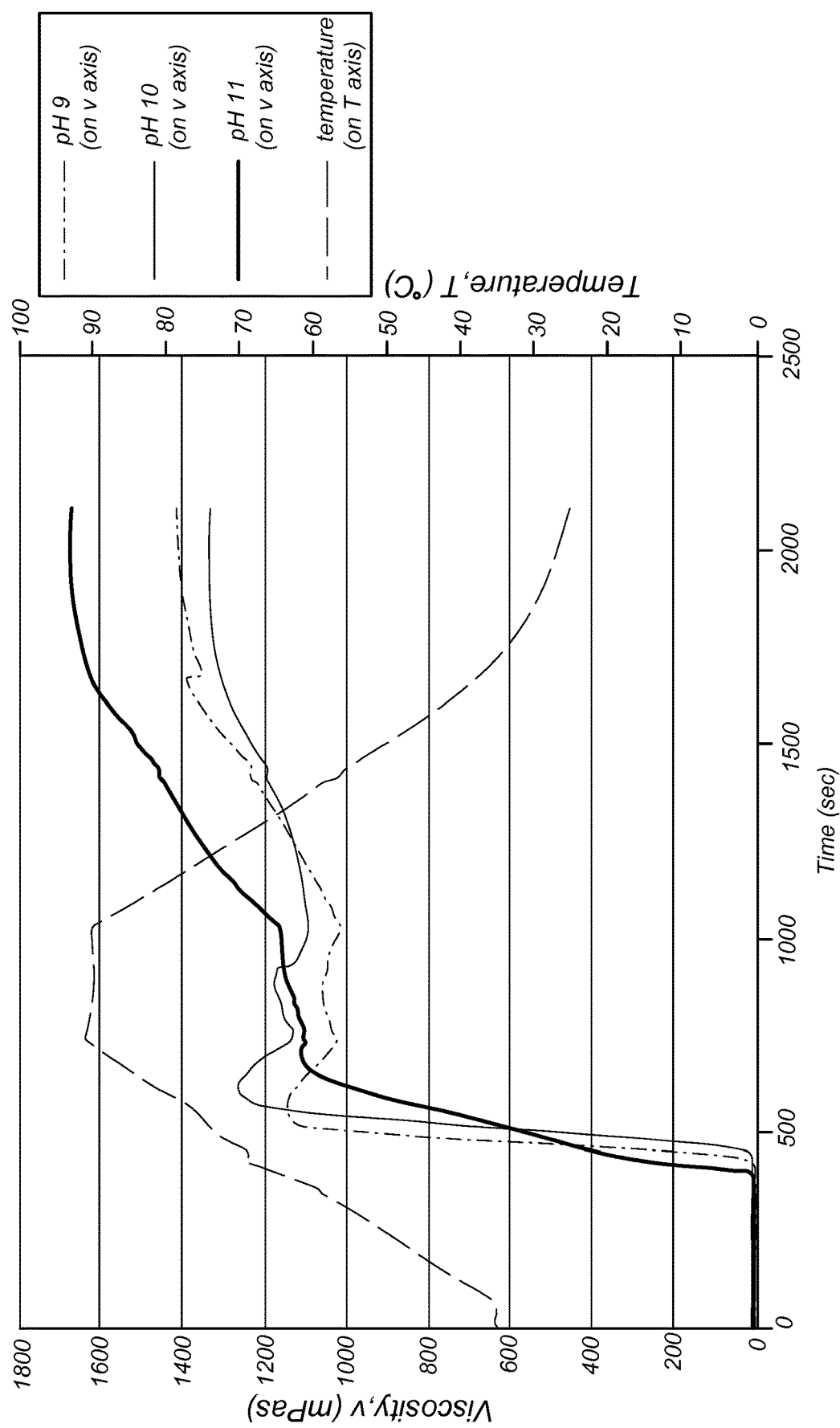

| | | | |
|---|---|---|---|
| 5,932,017 A * | 8/1999 | Chiu | A21D 6/003 |
| | | | 127/67 |
| 6,221,420 B1 | 4/2001 | Thomas et al. | |
| 6,235,894 B1 | 5/2001 | Bernd Wolfgang et al. | |
| 6,468,355 B1 | 10/2002 | Thompson et al. | |
| 2001/0017133 A1 | 8/2001 | Chiu et al. | |
| 2013/0309386 A1 | 11/2013 | Xian-Zhong et al. | |
| 2013/0337118 A1 * | 12/2013 | Sistrunk | A23L 19/18 |
| | | | 426/95 |
| 2015/0201654 A1 * | 7/2015 | Essers | C08B 30/00 |
| | | | 426/661 |
| 2016/0053027 A1 * | 2/2016 | Essers | C08L 3/02 |
| | | | 127/33 |

OTHER PUBLICATIONS

Sair, "Heat-Moisture Treatment of Strarch", vol. 44, Jan. 1967, pp. 8-26.
International Search Report issued in PCT/EP2017/076255, dated Nov. 28, 2017.
Written Opinion of the International Searching Authority issued in PCT/EP2017/076255, dated Nov. 28, 2017.

\* cited by examiner

NON-CHEMICALLY MODIFIED FOOD STARCHES

CROSS-REFERENCE TO RELATED APPLICATIONS

This application is the National Phase of International Patent Application No. PCT/EP2017/076255, filed Oct. 13, 2017, published on Apr. 19, 2018 as WO/2018/069535 A1, which claims priority to European Application No. 16193765.1, filed Oct. 13, 2016. The contents of these applications are herein incorporated by reference in their entirety.

The invention relates to thermally inhibited starch, specifically a thermally inhibited non-pregelatinized granular starch, and to the production thereof. The invention is applicable to all types of starches, regardless of the origin. Specifically non-pregelatinized granular starches are used. Typically, the process of the invention may use lower initial pH values of the starch, specifically the non-pregelatinized granular starch, and the thermally inhibited starch, specifically the thermally inhibited non-pregelatinized granular starch, according to the invention attains viscostability after shorter thermal treatment times. The invention also relates to a thermally inhibited starch, specifically a thermally inhibited non-pregelatinized granular starch, displaying improved whiteness characteristics combined with the capability of retaining stable viscosity behaviour under acidic and neutral pH conditions as well as under shear conditions, and the use thereof in food applications.

BACKGROUND

Starch is used in various food and non-food applications. It can be used as an adhesive, as a viscosity modifier in coating formulations, texturizing agent in bakery products, fat replacer in margarine etc. The use of starch in food industry is extensive, not only for its energy content (carbohydrates), but also as a thickening or emulsifying agent. Native starches, however, require pre-treatment in order to have the required thickening and similar properties in situ. Prior to adding starch into the application (e.g. coating formulation) it needs to be released out of the granular structure. This is done by liquefaction (cooking up) of the starch in slurry. Native starch can only be cooked at low concentration (<10%) levels which limits its usage in applications that require high solid contents. Another drawback of starch is that its viscosity fluctuates in storage.

In order to overcome the above mentioned hurdles, to enhance the positive attributes and to eliminate the shortcomings of the native starch, it is modified. This can be done by either chemical, physical, physical-chemical or enzymatic processes. Most of these modifications are carried out in slurry or semi-dry conditions with exceptions of the enzymatic reactions that are carried out in solution (after liquefaction).

Starches modified by chemical crosslinking, such as phosphate crosslinking, have the required in situ properties, such as shear, acid and heat resistance. However, chemical modification is less desired in food applications.

Thermal inhibition is used as a 'clean label' equivalent to chemically crosslinked starches and has the advantage that it does not involve the use of chemicals for achieving crosslinking of starch. 'Clean label' foods are produced by non-chemical processing treatments, foods that do not involve artificial additives and chemical substances. This leads to an ingredient list that is clear, simple, comprehensible and attractive to the consumer.

U.S. Pat. No. 6,221,420 discloses a thermally inhibited starch which is inhibited from returning to its native state. The product is obtained by dehydrating starch to a moisture content below 1 wt % at a temperature of 100-125° C., followed by heat-treating the dry starch at about 140° C., in a fluidized bed. US 2001/0017133 discloses a similar process. These traditional starch inhibition processes follow the belief that the presence of water during heat treatment would be detrimental to the inhibition and lead to a product of less quality. U.S. Pat. No. 5,725,676 for instance describes that when starches are subjected to heat in the presence of water, acid hydrolysis or degradation of the starch can occur. Hydrolysis or degradation would impede or prevent inhibition; therefore, the conditions for the dehydration of the starch need to be chosen such that inhibition is favored over hydrolysis or degradation. Consequently, in traditional starch inhibition processes heat treatment is performed at dry conditions on anhydrous starch (i.e. <1 wt % moisture).

WO2014/042537 describes a process for producing thermally inhibited starch, resulting in a viscostable starch product. An alkaline starch with an initial pH of 9.1-11.2 and water content of 2-22 wt. % relative to dry starch is first heated at 130-190° C. while maintaining the water content of the starch above a level of 1 wt. % for a sufficient time and at a sufficient pressure for the inhibition of the starch to be initiated to form carboxylic acids before pH drops below 9. Afterwards, the heating of the starch is continued between 140 and 190° C. until viscostability is achieved, followed by cooling and optionally further processing the starch. It is advantageous if at least the first part of the heat treatment is carried out with active removal of water vapour.

However, while the traditional thermal inhibition processes are applicable to all types of starches (regardless of their origin) the required conditions vary greatly per type of starch. For instance, (waxy) potato starch typically requires a combination of high temperatures, long reaction times and high (initial) pH values for inhibition. This causes colorization of the starch product, meaning that the treated starch has a darker color compared to untreated starch. It is believed that the darker color may be caused by the formation and presence of charred particles, a consequence of the combination of high temperatures, long reaction times and high (initial) pH values for traditional thermal inhibition.

Also, the starches obtained using thermal inhibition conditions in the art typically do not display viscostable behavior under acid and/or shear conditions. Under influence of acid, such starch typically degrades in time. This is undesirable for food product shelf life, product appearance and quality, customer appreciation etc. Also, if traditionally thermally inhibited starch is cooked and shear forces are applied, the starch granules tend to fragment, leading to a viscosity decrease.

There is thus a need for providing processes for producing thermally inhibited starches, specifically thermally inhibited non-pregelatinized granular starches, with improved viscostability under shear conditions (shear representative to food processing) as well as under acid and neutral pH, while keeping a high viscosity build-up and an acceptable whiteness value. There is thus a need for less color formation, and consequently for lowering initial pH values of the starch, specifically the non-pregelatinized granular starch, in the process. There is also a need for the starch, specifically the non-pregelatinized granular starch, to attain such properties at shorter reaction time, so that less resources (e.g. in terms of heating energy and production time) are used and the process can be carried out more economically. There is also a need for viscostable starch, specifically viscostable non-pregelatinized granular starch, with less colorization, that is neutral, acid and shear stable.

LIST OF EMBODIMENTS

1. A process for producing thermally inhibited starch, preferably thermally inhibited non-pregelatinized granular starch comprising:
   (i) providing an alkaline starch, preferably an alkaline non-pregelatinized granular starch, having a pH of at least 7.2 or of at least 8;
   (ii) subjecting the starch to a hydrothermal treatment, preferably to obtain a hydrothermally treated non-pregelatinized granular starch, said hydrothermal treatment being at a temperature of 45-200° C., preferably of 100-170° C., with:
      steam at a steam pressure of 0.1-15 bar, where:
         at a given temperature T, the steam pressure is 0.3 bar above equilibrium steam pressure p(e), at said p(e) or below said p(e); or
         at a given steam pressure p, the temperature is 10° C. below dew point or vaporization point T(e), at said T(e) or above said T(e); or
      a gas mixture comprising water vapor at a partial water vapor pressure of 0.1-15 bar, where:
         at a given temperature T, the partial water vapor pressure is 0.3 bar above equilibrium partial water vapor pressure p(e), at said p(e) or below said p(e); or
         at a given partial water vapor pressure p, the temperature is 10° C. below dew point or vaporization point T(e), at said T(e) or above said T(e);
   (iii) dehydrating the starch, preferably the hydrothermally treated non-pregelatinized granular starch, to a moisture content of 2 wt % or lower and subjecting the starch to a thermal treatment by heating the starch to a temperature of 120-190° C., to obtain viscostability;
   (iv) cooling and optionally further processing the starch.
2. The process according to embodiment 1, wherein the starch, preferably the hydrothermally treated non-pregelatinized granular starch, resulting from step (ii) is dehydrated to a moisture content of 1.5 wt % or lower, more preferably 1 wt % or lower.
3. The process according to any one of the preceding embodiments, wherein the alkaline starch, preferably the alkaline non-pregelatinized granular starch provided in step (i) has a pH of at least 7.5, preferably of at least 8 or a pH of 8-11, preferably of 8.5-10.5.
4. The process according to any one of the preceding embodiments, wherein, the starch subjected to the hydrothermal treatment has an initial moisture content of 30 wt % or lower, preferably 25 wt % or lower, more preferably more than 2 wt %.
5. The process according to any one of the preceding embodiments, wherein the hydrothermal treatment involves a temperature of 80-170° C., more preferably of 100-150° C., most preferably of 110-140° C. or a temperature of 100-160° C., more preferably of 105-155° C., most preferably of 110-150° C.
6. The process according to any one of the preceding embodiments, wherein the hydrothermal treatment involves a steam pressure or partial water vapor pressure p of 0.3-10 bar, preferably 0.5-7 bar, more preferably 1-5 bar.
7. The process according to any one of the preceding embodiments, wherein the hydrothermal treatment is conducted for at least 5 minutes, preferably 5-180 minutes or for at least 15 minutes, preferably 15-180 minutes.
8. The process according to any one of the preceding embodiments, wherein the hydrothermal treatment is conducted with superheated or saturated steam.
9. The process according to any one of the preceding embodiments, wherein the thermal treatment (iii) involves a temperature of 130-190° C., preferably of 140-185° C., and for a period of 1-4 hours, preferably 1-3 hours.
10. The process according to any one of the preceding embodiments, wherein the starch, preferably the non-pregelatinized granular starch is a starch, preferably a non-pregelatinized granular starch, or starch-containing product, preferably a non-pregelatinized granular starch-containing product, wherein the starch, preferably the non-pregelatinized granular starch, is preferably maize or corn starch, rice starch, wheat starch, tapioca starch and/or potato starch, more preferably the non-pregelatinized granular starch is a root and/or tuber starch, preferably waxy root and/or waxy tuber starch, more preferably the starch is potato starch and/or tapioca starch, even more preferably the starch is waxy potato starch and/or waxy tapioca starch, even more preferably the starch is a potato starch, most preferably the starch is waxy potato starch.
11. A thermally inhibited starch, preferably a thermally inhibited non-pregelatinized granular starch obtainable by the process according to any one of the preceding embodiments.
12. A thermally inhibited starch, preferably a thermally inhibited non-pregelatinized granular starch according to embodiment 11, having viscostability at pH 2.5-7.5.
13. A thermally inhibited starch, preferably a thermally inhibited non-pregelatinized granular starch according to any one of embodiments 11-12, having a whiteness value L of at least 80, preferably at least 85, more preferably at least 90 on the Commission Internationale de l'Éclairage (CIE) scale.
14. Use of a thermally inhibited starch, preferably a thermally inhibited non-pregelatinized granular starch according to any one of embodiments 11-13, in a food product.

DESCRIPTION OF THE INVENTION

It was found that a process for producing thermally inhibited starch, specifically thermally inhibited non-pregelatinized granular starch, using starch, specifically non-pregelatinized granular starch, with an initial alkaline pH, can be improved in terms of reaction time and whiteness, viscosity and viscostability (at acid and neutral pH as well as under shear) of the product by subjecting the starch, specifically the non-pregelatinized granular starch, to a hydrothermal treatment, specifically to obtain a hydrothermally treated non-pregelatinized granular starch, before the starch is subjected to thermal treatment. After thermal treatment, the starch is cooled and optionally further processed. The process according to the invention enables using starch, specifically non-pregelatinized granular starch, with lower alkaline initial pH values, resulting in less colorization of the ultimate starch product, specifically the ultimate non-pregelatinized granular starch product. Not only does the process thus lead to better product quality, the fact that less colorization of the starch, specifically the non-pregelatinized granular starch, occurs also means that less (extensive) processing, preferably less (extensive) recovery steps, more preferably no recovery of the starch is required. With the present process, less (extensive) washing steps, preferably no washing of the product is necessary.

Without wishing to be bound by any theory, the inventors believe that the hydrothermal treatment, specifically to obtain a hydrothermally treated non-pregelatinized granular starch, enables control of the moisture level of the starch, specifically the non-pregelatinized granular starch, during the initiation and initial stages of inhibition, since it creates a moist environment for the starch in which a chemical equilibrium comes into place between the water content in the starch and in the environment. The inventors believe that controlled moisture content in the starch, specifically the non-pregelatinized granular starch, at the initiation and initial stages of inhibition are important for achieving desired whiteness and viscostability of the product. Also, the inventors found that the hydrothermal treatment step, specifically to obtain a hydrothermally treated non-pregelatinized granular starch, makes it possible to use such lower alkaline initial pH values of the starch, specifically the non-pregelatinized granular starch, and that this hydrothermal treatment step is thus important for having better whiteness. During and/or after hydrothermal treatment the crystallinity of the starch, specifically the non-pregelatinized granular starch, is decreased compared to the crystallinity of native starch. This loss in crystallinity is believed to increase the effectiveness of the base in the mechanism of inhibition, hence enabling the usage of lower amounts thereof, resulting in better control of the process conditions and in a reduction in color formation. Reference is made to examples 4 and 6.

The starch, specifically the non-pregelatinized granular starch, more specifically the hydrothermally treated non-pregelatinized granular starch is subjected to dehydration to a substantially anhydrous state (i.e. a moisture content of 2 wt % or lower, preferably less than 1.5 wt %), preferably an anhydrous state (i.e. a moisture content of 1 wt % or lower), and, preferably subsequently, to thermal treatment at a temperature of e.g. 120-190° C., for continuing starch inhibition, until viscostability is achieved. Such thermal treatment is in accordance with conventional inhibition treatment, albeit that the preceding hydrothermal treatment, specifically to obtain a hydrothermally treated non-pregelatinized granular starch, makes it possible to work at economically attractive decreased temperatures and shorter time periods and putting less burden on the inhibited starch, specifically the inhibited non-pregelatinized granular starch, thus formed. Thermal treatment reaction time until reaching viscostability may for instance be reduced by at least 1 hour. The inhibition process is believed to proceed by crosslinking within the starch molecules.

With the process according to the invention, crosslinking of the starch is brought about by thermal treatment. There is no use for chemical cross-linking agents or other chemical additives such as surfactants, rendering the process "clean-label" as well as environmentally friendly. A viscostable starch, specifically a viscostable non-pregelatinized granular starch, is obtained as a product, suitable e.g. as a thickener or emulsifier. A particular advantage of the viscostable starch, specifically the viscostable non-pregelatinized granular starch, according to the invention is that it exhibits viscostability under shear conditions that may be applied to food products as well as under pH circumstances that are typically present in food products, that is to say, at acid and neutral pH. This widens the range of food applications where the viscostable starch, specifically the viscostable non-pregelatinized granular starch, may be used, including e.g. acidic food products such as soups or sauces. Shelf-life, stability, quality, appearance and customer appreciation are improved.

Another particular advantage of the process according to the invention is that it causes much less colorization of the starch, specifically the non-pregelatinized granular starch. Colorization of inhibited starch, specifically inhibited non-pregelatinized granular starch is undesirable, since it may also cause colorization of the food product in which it is applied. Consequently, the viscostable starch, specifically the viscostable non-pregelatinized granular starch, according to the invention typically also has a desirable white appearance, reflected by a high whiteness value.

Another advantage of the process according to the invention is that it can be performed in relatively simple equipment, not requiring fluidised beds or the like.

Thus, the invention pertains to a process for producing thermally inhibited starch, specifically thermally inhibited non-pregelatinized granular starch, comprising:
(i) providing an alkaline starch, specifically an alkaline non-pregelatinized granular starch, having a pH of at least 7.2;
(ii) subjecting the starch to a hydrothermal treatment, specifically to obtain a hydrothermally treated non-pregelatinized granular starch, said hydrothermal treatment being at a temperature of 45-200° C. with:
steam at a steam pressure of 0.1-15 bar, where:
at a given temperature T, the steam pressure is 0.3 bar above equilibrium steam pressure p(e), at said p(e) or below said p(e); or
at a given steam pressure p, the temperature is 10° C. below dew point or vaporization point T(e), at said T(e) or above said T(e); or
a gas mixture comprising water vapor at a partial water vapor pressure of 0.1-15 bar, where:
at a given temperature T, the partial water vapor pressure is 0.3 bar above equilibrium partial water vapor pressure p(e), at said p(e) or below said p(e); or
at a given partial water vapor pressure p, the temperature is 10° C. below dew point or vaporization point T(e), at said T(e) or above said T(e);
(iii) dehydrating the starch, specifically the hydrothermally treated non-pregelatinized granular starch to a moisture content of 2 wt % or lower and subjecting the starch to a thermal treatment by heating the starch to a temperature of 120-190° C. to obtain viscostability;
(iv) cooling and optionally further processing the starch.

Worded differently, in the hydrothermal treatment (ii), specifically to obtain a hydrothermally treated non-pregelatinized granular starch:
for steam at a steam pressure of 0.1-15 bar:
at a given temperature T, the steam pressure is 0.3 bar above equilibrium steam pressure p(e) or less; or
at a given steam pressure p, the temperature is 10° C. below dew point or vaporization point T(e) or higher; or
for a gas mixture comprising water vapor at a partial water vapor pressure of 0.1-15 bar:
at a given temperature T, the partial water vapor pressure is 0.3 bar above equilibrium partial water vapor pressure p(e) or less; or
at a given partial water vapor pressure p, the temperature is 10° C. below dew point or vaporization point T(e) or higher.

In one embodiment, the dehydration, specifically of the hydrothermally treated non-pregelatinized granular starch, and thermal treatment (iii) are carried out consecutively, meaning that the starch, specifically the non-pregelatinized granular starch, more specifically the hydrothermally treated non-pregelatinized granular starch is first dehydrated to a moisture content of 2 wt % or lower and subsequently subjected to said thermal treatment. For instance, dehydration, specifically of the hydrothermally treated non-pregelatinized granular starch, and thermal treatment can be carried out in different systems or reactors or dehydration, specifically of the hydrothermally treated non-pregelatinized granular starch, can be carried out by a different means than thermal treatment. In another embodiment, dehydration, specifically of the hydrothermally treated non-pregelatinized granular starch, and thermal treatment are combined. For instance, dehydration, specifically of the hydrothermally treated non-pregelatinized granular starch, and thermal treatment can be carried out in the same system or reactor or can dehydration, specifically of the hydrothermally treated non-pregelatinized granular starch, be carried out by a similar means, such as heating, as thermal treatment.

The starch produced and/or used in the process of the invention specifically is a non-pregelatinized granular starch. Worded differently: the process of the invention preferably does not produce and/or use pregelatinized or gelatinized, non-granular starches. Native starch granules typically show birefringence or a typical Maltese cross when viewed in polarized light. This property is brought about because the starch molecules are radially oriented within the granule. When starch is heated in water, birefringence or Maltese cross pattern in polarized light may be lost, which may be associated with disruption of the granular structure of the starch, forming non-granular starch. This is called starch gelatinization. Pregelatinized or gelatinized starch in the context of the invention preferably is understood to mean that the starch has lost at least 70%, preferably at least 80%, more preferably at least 90%, most preferably substantially 100% of its birefringence and/or granular structure, specifically that the starch no longer exhibits a granular structure and/or birefringence or Maltese crosses when illuminated using polarized light, preferably after processing the starch, more preferably after heating the starch, more preferably after heating the starch in presence of water, specifically more than 5 wt %, more specifically more than 2 wt %, most specifically more than 1 wt % water, most preferably after hydrothermal treatment and/or thermal (inhibition) treatment of the starch. Non-pregelatinized starch in the context of the invention preferably is understood to mean that the starch has lost less than 30%, preferably less than 20%, more preferably less than 10%, even more preferably less than 5%, even more preferably less than 1%, most preferably substantially 0% of its birefringence and/or granular structure, specifically that the starch substantially preserves a granular structure and/or birefringence or Maltese crosses when illuminated using polarized light, preferably after processing the starch, more preferably after heating the starch, more preferably after heating the starch in presence of water, specifically more than 5 wt %, more specifically more than 2 wt %, most specifically more than 1 wt % water, most preferably after hydrothermal treatment and/or thermal (inhibition) treatment of the starch. Preferably, no solvent, specifically no solvent other than water, preferably no alcohol or alcoholic medium is used in said processing, said heating, said hydothermal treatment and/or said thermal (inhibition) treatment of the starch. The extent to which starch granules exhibit a granular structure and/or birefringence or Maltese crosses can be conventially determined by the skilled person using techniques commonly known in the art such as illumination with polarized light and viewing under a (light) microscope. The starch, specifically the non-pregelatinized granular starch, to be used in the process of the invention can be a starch, specifically a non-pregelatinized granular starch, or a starch containing product, specifically a non-pregelatinized granular starch containing product, such as flour, preferably comprising 0.1-100 wt %, preferably 1-90 wt %, preferably 5-80 wt %, preferably 10-70 wt % of starch relative to total product weight. Unless indicated otherwise, the wt % used throughout the description and claims are calculated relative to dry starch.

The starch, specifically the non-pregelatinized granular starch, may contain at least e.g. 70% (w/w) of amylopectin. The starch or starch contained in the starch containing product may be any common type of starch, specifically any common type of non-pregelatinized granular starch, or combinations of starches, specifically combinations of non-pregelatinized granular starches. Said starch may be native starch and/or derivatives thereof, specifically non-pregelatinized granular native starch and/or derivatives thereof. Said starch, specifically said non-pregelatinized granular starch can suitably originate from roots, tubers, piths, cereals and/or legumes. Legumes include peas, beans and lentils. Said starch, specifically said non-pregelatinized granular starch can also be isolated from other plants. Said starch, specifically said non-pregelatinized granular starch can for instance originate from maize or corn, rye, barley, sorghum, wheat, rice, triticale, millet, tapioca, arrow root, canna, banana, potato, sweet potato, piths such as sago and/or legumes, such as beans, peas and lentils. In the context of the invention, (non-pregelatinized granular) potato starch preferably is understood to mean (non-pregelatinized granular) non-sweet potato starch. In a further embodiment so-called waxy starches, specifically non-pregelatinized granular waxy starches, are employed. These starches consist for more than 93 wt. % of amylopectin. Waxy starches, specifically non-pregelatinized granular waxy starches, that can be used in the invention are waxy maize starch, waxy wheat starch, waxy barley starch, waxy sorghum starch, waxy rice starch, waxy potato starch, and/or waxy tapioca starch. Preferably the starch, specifically the non-pregelatinized granular starch, is maize or corn starch, rice starch, wheat starch, tapioca starch and/or potato starch, more preferably the starch is potato starch and/or tapioca starch, even more preferably the starch is waxy potato starch and/or waxy tapioca starch, even more preferably the starch is potato starch, most preferably the starch is waxy potato starch. In a preferred embodiment, the starch, specifically the non-pregelatinized granular starch, is a root and/or tuber starch, preferably waxy root and/or waxy tuber starch, more preferably the starch is potato starch and/or tapioca starch, even more preferably the starch is waxy potato starch and/or waxy tapioca starch, even more preferably the starch is potato starch, most preferably waxy potato starch. By using the traditional thermal inhibition process of starch, described e.g. by U.S. Pat. No. 6,221,420 and US 2001/0017133, and also by the improved process of WO2014/042537 it is typically very difficult to attain viscostability for starches, specifically non-pregelatinized granular starches, being (waxy) root and/or (waxy) tuber starches, especially for (waxy) potato starch and/or (waxy) tapioca starch, more especially for potato starch, more preferably waxy potato starch. WO2014/042537 describes experiments showing viscostability for waxy potato starch at high initial pH and long thermal treatment times at high temperatures. The process according to the invention however permits to attain viscostability, particularly for starches, specifically non-pregelatinized granular starches, being (waxy) root and/or (waxy) tuber starches, especially for (waxy) potato starch and/or (waxy) tapioca starch, more especially for potato starch, more particularly waxy potato starch, at a lower initial pH and at shorter thermal treatment times.

Starches may be alternatively classified by their granular structures. Amylose and amylopectin molecules are arranged in starch granules, which are complex structures consisting of crystalline and amorphous areas. The amylopectin molecules are organized in double helices, some of which form crystalline lamellae or crystallites. These crystallites are packed in polymorph structures or crystalline forms, which are a three-dimensional arrangement of crystallites in starch granules. For starch granules, A, B and C type crystallinities are distinguished in the art. Starches of A type crystallinity typically involve cereal starches such as rice, rye, corn or maize and wheat starches, but also sweet potato starch. Starches of B type crystallinity typically involve root and/or tuber starches as well as starches with a high amylose content. Examples of starches of B type crystallinity are canna and potato starch. In the context of the invention, potato starch preferably is understood to mean non-sweet potato starch. Starches of C type crystallinity typically involve sago, arrow root and legume starches such as peas, beans and/or lentils. Mixtures of A, B and/or C types of crystallinities also exist. Tapioca starch, for example is a mixture of A and C type crystallinity. The A and B type crystallinities differ in the geometry of their single unit cells, the packing density of their double helices and the amount of bound water within the crystal structure: A is typically more dense and binds less water than B (e.g. 36 water molecules in the B-type cell and 8 in the A-type cell). C is a mixture of both A and B polymorphs. Starches of A, B and C type crystallinity can be conventionally distinguished from each other using techniques commonly known in the art such as e.g. X-ray diffraction (XRD). Starches of A, B and C type crystallinity will yield different patterns in their X-Ray Diffractograms by means of which they can be distinguished from each other.

According to the invention, starches, specifically non-pregelatinized granular starches, of type A, B and/or C crystallinity or mixtures thereof are used, preferably of B and/or C crystallinity, mixtures thereof and/or a mixture of A and C crystallinity, more preferably of B and/or C crystallinity and/or mixtures thereof, most preferably of B crystallinity. In an embodiment, starches, specifically non-pregelatinized granular starches, of B crystallinity and/or a mixture of A and C crystallinity are used. In other words: in an embodiment of the invention starches, specifically non-pregelatinized granular starches, of type A crystallinity are not used, preferably type A and/or C crystallinity are not used.

Accordingly, the alkaline starch, specifically the alkaline non-pregelatinized granular starch, provided in step (i) has a pH of at least 7.2, preferably at least 7.5, preferably at least 8, preferably 8-11.5, preferably 8-11, preferably 8.5-10.5, even more preferably 8.5-10, most preferably of 9-10. Particularly, said pH is lower than 11.5, more particularly lower than 11. At such relatively low alkaline initial pH values, less colorization of the resulting starch product, specifically the non-pregelatinized granular starch product is achieved.

The alkaline starch, specifically the alkaline non-pregelatinized granular starch, provided in step (i) preferably has an initial moisture content of 45 wt % or lower, preferably 40 wt % or lower, preferably 35 wt % or lower, preferably 30 wt % or lower, preferably 25 wt % or lower, preferably 20 wt % or lower, more preferably 15 wt % or lower, preferably 10 wt % or lower. It is preferred that the said initial moisture content is more than 2 wt %, more preferably more than 3 wt %, even more preferably more than 5 wt %. Particularly, said initial moisture content is of 2.1-45 wt %, preferably 2.1-40 wt %, preferably 2.1-35 wt %, preferably 2.1-30 wt %, preferably 2.5-25 wt %, preferably 3-20 wt %, more preferably 4-15 wt %, preferably 5-10 wt %. Particularly, said alkaline starch, specifically said alkaline non-pregelatinized granular starch, provided in step (i) is subjected to a hydrothermal treatment in step (ii), specifically to obtain a hydrothermally treated non-pregelatinized granular starch.

An important feature of the process of the invention is the hydrothermal treatment in step (ii), specifically to obtain a hydrothermally treated non-pregelatinized granular starch, with steam or a gas mixture comprising water vapor as defined in the following. The hydrothermal treatment involves a temperature of 45-200° C., preferably 50-195° C., preferably 60-190° C., preferably 65-185° C., preferably 70-180° C., preferably 75-175° C., preferably 80-170° C., more preferably 85-160° C., even more preferably of 90-160° C., preferably 95-155° C., preferably 100-150° C., preferably 105-145° C. and most preferably of 110-140° C. In an embodiment, the hydrothermal treatment involves a temperature of 80-180° C., preferably 90-170° C., preferably 100-170° C., more preferably 100-160° C., more preferably 105-155° C., even more preferably 110-150° C., even more preferably 115-145° C., most preferably 120-140° C. In an embodiment, the hydrothermal treatment involves a temperature of 115-160° C., preferably 115-155° C., more preferably 120-155° C., even more preferably 120-150° C., most preferably 120-145° C.

Unless indicated otherwise, the pressures referred to throughout the description and claims are absolute pressures (i.e. zero-referenced against a perfect vacuum), measured in bar. For the embodiment with steam, the hydrothermal treatment involves a steam pressure p; for the embodiment with a gas mixture comprising water vapor, the hydrothermal treatment involves a partial water vapor pressure p. The hydrothermal treatment thus involves steam pressures or partial water vapor pressures p of 0.1-15 bar, preferably 0.1-12 bar, preferably 0.1-11 bar, preferably 0.1-10 bar, preferably 0.2-9 bar, preferably 0.3-8 bar, preferably 0.4-7 bar, preferably 0.5-6 bar, preferably 0.6-5 bar, preferably 0.7-4.5 bar, preferably 0.8-4 bar, preferably 0.9-4 bar, preferably 1-4 bar, preferably 1.1-4 bar, preferably 1.2-4 bar, preferably 1.3-4 bar, preferably 1.4-4 bar, most preferably 1.5-4 bar. In an embodiment, the hydrothermal treatment thus involves steam pressures or partial water vapor pressures p of 1 bar or higher, preferably of 1-10 bar, more preferably 1-7 bar, more preferably 1-5 bar, more preferably 1-3 bar, most preferably 1-2 bar.

The hydrothermal treatment, specifically to obtain a hydrothermally treated non-pregelatinized granular starch, may be conducted in total for at least 5 minutes, preferably at least 10 minutes, preferably at least 15 minutes, preferably at least 20 minutes, preferably at least 25 minutes, preferably at least 30 minutes, preferably 5-240 minutes, preferably 10-240 minutes, preferably 15-240 minutes, preferably 5-180 minutes, preferably 10-180 minutes, preferably 15-180 minutes, preferably 20-180 minutes, more preferably 20-150 minutes, more preferably 20-120 minutes, more preferably 25-90 minutes, most preferably 30-60 minutes. In an embodiment, the temperature and/or pressure applied in hydrothermal treatment, specifically to obtain a hydrothermally treated non-pregelatinized granular starch, vary, but within the ranges of the invention.

The hydrothermal treatment, specifically to obtain a hydrothermally treated non-pregelatinized granular starch, is conducted with steam or a gas mixture comprising water vapor, preferably 15-100 vol % of the gas mixture is water vapor, more preferably 20-90 vol %, preferably 25-80 vol %, preferably 30-70 vol %, preferably 30-60 vol %, preferably 35-50 vol %. In the following, where the term 'steam' is used, reference is made to both 'steam' and 'water vapor' comprised in the gas mixture. The steam may be superheated steam or saturated steam, more preferably the steam is saturated. In this context, saturated steam refers to a state where steam (gas) and heated water (liquid) coexist. Saturated steam occurs at the vaporization point (also referred to as the boiling point) or dew point of water, T(e). This temperature T(e) at which saturated steam occurs depends on the steam pressure p applied or, for the gas mixture, on the partial water vapor pressure p applied. An embodiment of the invention thus involves a hydrothermal treatment (ii), specifically to obtain a hydrothermally treated non-pregelatinized granular starch, at a combination of temperature and pressure which results in saturated steam. For a given temperature T, the skilled person can find guidance in the 'steam table' below, to find the corresponding steam pressure p, or for the gas mixture, partial water vapor pressure p, in order to obtain saturated steam. This corresponding pressure is referred to as the saturated or equilibrium steam pressure p(e) or saturated or equilibrium partial water vapor pressure p(e), respectively.

Consequently, in a preferred embodiment of the process according to the invention, at a given temperature T, hydrothermal treatment, specifically to obtain a hydrothermally treated non-pregelatinized granular starch, is carried out with steam or with a gas mixture comprising water vapor at p(e) or within 0.3 bar of p(e), preferably at p(e) or within 0.2 bar of p(e), more preferably at p(e) or within 0.1 bar of p(e), most preferably at p(e). Or in other words: at a given steam pressure or partial water vapor pressure p, hydrothermal treatment, specifically to obtain a hydrothermally treated non-pregelatinized granular starch, is carried out at T(e) or within 10° C. of T(e), preferably at T(e) or within 5° C. of T(e), more preferably at T(e) or within 2° C. of T(e), even more preferably at T(e) or within 1° C. of T(e), most preferably at the dew point or vaporization point T(e).

Correspondingly, in an embodiment, the hydrothermal treatment may involve steam pressures or partial water vapor pressures p of 10.3 bar or below, preferably 10.2 bar or below, more preferably 10.1 bar or below, even more preferably 10 bar or below. In an embodiment, the hydrothermal treatment may involve steam pressures or partial water vapor pressures p of 7.3 bar or below, preferably 7.2 bar or below, more preferably 7.1 bar or below, even more preferably 7 bar or below. In an embodiment, the hydrothermal treatment may involve steam pressures or partial water vapor pressures p of 5.3 bar or below, preferably 5.2 bar or below, more preferably 5.1 bar or below, even more preferably 5 bar or below. In an embodiment, the hydrothermal treatment may involve steam pressures or partial water vapor pressures p of 4.3 bar or below, preferably 4.2 bar or below, more preferably 4.1 bar or below, even more preferably 4 bar or below. In an embodiment, the hydrothermal treatment may involve steam pressures or partial water vapor pressures p of 1.7 bar or above, preferably 1.8 bar or above, more preferably 1.9 bar or above, even more preferably of 2 bar or above. In an embodiment, the hydrothermal treatment may involve steam pressures or partial water vapor pressures p of 0.7 bar or above, preferably of 0.8 bar or above, more preferably of 0.9 bar or above, even more preferably of 1 bar or above.

Particularly, the hydrothermal treatment may involve steam pressures or partial water vapor pressures p within a range comprising any combination of the above lower and upper limits.

Correspondingly, in an embodiment, the hydrothermal treatment may be at a temperature within a range comprising any combination of a lower limit of 99.6° C. or 120.2° C., with an upper limit of 143.6° C., 151.8° C., 165.0° C. or 179.9° C.

In an embodiment, the hydrothermal treatment, specifically to obtain a hydrothermally treated non-pregelatinized granular starch, is carried out at a temperature of 70-200° C., which according to the steam table below, means that p(e) is preferably 0.3-15 bar. In another embodiment, the hydrothermal treatment, specifically to obtain a hydrothermally treated non-pregelatinized granular starch, is carried out at a steam pressure or partial water vapor pressure p of 0.1-15 bar, which according to the steam table below, means that T(e) is preferably 45.8-198.3° C. All temperatures T(e), steam pressures or partial water vapor pressures p(e) and combinations thereof described in the table below are embodiments of the invention.

| STEAM TABLE | |
|---|---|
| Dew point or vaporization point Temperature T(e) (° C.) | Saturated or Equilibrium Steam pressure or partial water vapor pressure p(e)(bar) |
| 7.0 | 0.01 |
| 17.5 | 0.02 |
| 24.1 | 0.03 |
| 29.0 | 0.04 |
| 32.9 | 0.05 |
| 39.0 | 0.07 |
| 45.8 | 0.1 |
| 60.1 | 0.2 |
| 69.1 | 0.3 |
| 75.9 | 0.4 |
| 81.4 | 0.5 |
| 90.0 | 0.7 |
| 99.6 | 1 |
| 120.2 | 2 |
| 133.5 | 3 |
| 143.6 | 4 |
| 151.8 | 5 |
| 165.0 | 7 |
| 179.9 | 10 |
| 198.3 | 15 |
| 212.4 | 20 |
| 223.9 | 25 |
| 233.8 | 30 |
| 242.5 | 35 |
| 250.3 | 40 |

Saturated steam thus is steam that has not been heated past the vaporization point or boiling point T(e) at a pressure p(e). In the context of the invention, the used steam or the gas mixture, has a water content of 1-100 wt %, preferably 5-99 wt %, preferably 10-95 wt %, preferably 15-90 wt %, preferably less than 80 wt %, more preferably less than 70 wt %, relative to the total weight of the steam or gas mixture.

When saturated steam at vaporization point temperature T(e) and pressure p(e) is heated further while pressure is kept constant, it will become superheated steam. This is a dry steam at a temperature T higher than the vaporization point or dew point T(e) that is connected to the applied steam pressure or partial water vapor pressure p. A way of obtaining superheated steam is heating beyond vaporization point T(e) at the applied constant steam pressure or constant partial water vapor pressure p or by decreasing the steam pressure or partial water vapor pressure from p(e) at the applied constant temperature T. Consequently, in a preferred embodiment of the process according to the invention, at a given temperature T, hydrothermal treatment, specifically to obtain a hydrothermally treated non-pregelatinized granular starch, is carried out with steam or with a gas mixture comprising water vapor below p(e). Or in other words: at a given steam pressure or partial water vapor pressure p, hydrothermal treatment, specifically to obtain a hydrothermally treated non-pregelatinized granular starch, is carried out at a temperature above T(e).

In an embodiment of the present invention, the hydrothermal treatment, specifically to obtain a hydrothermally treated non-pregelatinized granular starch, is carried out at a steam pressure or partial water vapor pressure p within the range of 0.1-15 bar, where the temperature of hydrothermal treatment T is higher than the corresponding T(e) (according to the steam table). In another embodiment of the present invention, the hydrothermal treatment, specifically to obtain a hydrothermally treated non-pregelatinized granular starch, is carried out at a temperature of 70-200° C., where the steam pressure or partial water vapor pressure p is below the corresponding p(e) (again, see steam table).

In one embodiment of the process according to the invention, the hydrothermal treatment (ii), specifically to obtain a hydrothermally treated non-pregelatinized granular starch, preferably involves, within the temperature and pressure ranges of the invention as defined hereinbefore, a combination of T and p according to the Goff-Gratch experimental correlation:

$$\log e^* = -7.90298(T_{st}/T - 1) + \\ 5.02808 \log(T_{st}/T) - 1.3816 \times 10^{-7}(10^{11.344(1-T/T_{st})} - 1) + \\ 8.1328 \times 10^{-3}(10^{-3.49149(T_{st}/T-1)} - 1) + \log e^*_{st}$$

where:
log refers to the logarithm in base 10
e* is the saturation water vapor pressure (hPa)
T is the absolute air temperature in K
$T_{st}$ is the steam-point (i.e. boiling point at 1 atm=1 bar) temperature (373.15 K)
$e^*_{st}$ is e* at the steam-point pressure (1 atm=1 bar=1013.25 hPa).

Preferably, at a given T, p is 0.3 bar, preferably 0.2 bar, more preferably 0.1 bar above, equal to, or below the Goff-Gratch experimental correlation; or, at a given p, T is 10° C., preferably 5° C., more preferably 2° C. below, equal to, or above the Goff-Gratch experimental correlation. More preferably, at a given T, p is equal to or within 0.3 bar, preferably within 0.2 bar, more preferably within 0.1 bar of the Goff-Gratch experimental correlation; or at a given p, T is equal to or within 10° C., preferably within 5° C., more preferably within 2° C. of the Goff-Gratch experimental correlation.

In the process according to the invention, the hydrothermal treatment (ii), specifically to obtain a hydrothermally treated non-pregelatinized granular starch, more preferably involves a combination of T and p, within the temperature and pressure ranges of the invention as defined hereinbefore, according to:

at a given temperature T: p (in bar) is 0.3 bar, preferably 0.2 bar, more preferably 0.1 bar above, equal to, or is below of $$p \text{ (in bar)}=1.35\times10^{-33}([\text{temperature (in ° C.)}+273.15])^{12.766}, \text{ or}$$

at a given steam pressure or partial water vapor pressure p, T (in ° C.) is 10° C., preferably 5° C., more preferably 2° C. below, equal to, or is above of $$T \text{ (in ° C.)}=375.86([\text{steam or partial water vapor pressure (bar)}])^{0.078}-273.15.$$

In the process according to the invention, the hydrothermal treatment (ii), specifically to obtain a hydrothermally treated non-pregelatinized granular starch, more preferably involves a combination of T and p, within the temperature and pressure ranges of the invention as defined hereinbefore, according to:

at a given temperature T: p (in bar) is equal to or within 0.3 bar, preferably within 0.2 bar, more preferably within 0.1 bar of $$p(\text{in bar})=1.35\times10^{-33}([\text{temperature(in ° C.)}+273.15])^{12.7665}, \text{ or}$$

at a given steam pressure or partial water vapor pressure p, T (in ° C.) is equal to or within 10° C., preferably within 5° C., more preferably within 2° C. of $$T(\text{in ° C.})=375.86([\text{steam or partial water vapor pressure(bar)}])^{0.078}-273.15.$$

Suitably, hydrothermal treatment, specifically to obtain a hydrothermally treated non-pregelatinized granular starch, is carried out in a system, preferably a closed-system, such as a closed reaction vessel. Preferably, the relative humidity in the system is 5-100%, more preferably 10-99%, preferably 20-97%, preferably 30-95%, preferably 40-90%, preferably 50-85%, preferably 60-80%.

During hydrothermal treatment, specifically to obtain a hydrothermally treated non-pregelatinized granular starch, temperatures are employed at which starch inhibition, specifically non-pregelatinized granular starch inhibition, is at least initiated. In contrast to the traditional inhibition processes, it is believed that it is important that the initiation of starch inhibition, specifically non-pregelatinized granular starch inhibition, occurs under relatively mild conditions, e.g. non-anhydrous conditions, yet in a controlled way. The moist environment is important for the control of water content in the starch, specifically the non-pregelatinized granular starch, during the exposure to heat at the temperatures of hydrothermal treatment. It is preferred that the water content in the starch, specifically the non-pregelatinized granular starch, is maintained above 1.5 wt %, preferably at 2 wt % or higher, preferably at 2.5 wt % or higher, preferably at 3 wt % or higher and most preferably at 3.5 wt % or higher during hydrothermal treatment. The water content in the starch, specifically the non-pregelatinized granular starch, during hydrothermal treatment may be of 7.5 wt % or lower, preferably 7 wt % or lower, more preferably 6.5 wt % or lower, even more preferably 6 wt % or lower. Particularly, said water content in the starch, specifically the non-pregelatinized granular starch, during and after hydrothermal treatment may be 2.1-7.5 wt %, preferably 2.5-7 wt %, more preferably 3-6.5 wt %, preferably 3.5-6 wt %. After hydrothermal treatment a hydrothermally treated non-pregelatinized granular starch is obtained.

In an embodiment, the initial moisture content of the starch, specifically the non-pregelatinized granular starch, in step (i) is higher than said water content in the starch, specifically the non-pregelatinized granular starch, during hydrothermal treatment. The equilibrium between the water in the starch, specifically the non-pregelatinized granular starch, and the steam used in hydrothermal treatment may be reached as the starch, specifically the non-pregelatinized granular starch, of step (i) is partially dehydrated. During hydrothermal treatment in step (ii), the starch, specifically the non-pregelatinized granular starch, may thus be partially dehydrated relative to the initial moisture content in step (i). During hydrothermal treatment in step (ii), the starch, specifically the non-pregelatinized granular starch, is however not dehydrated to a substantially anhydrous state, meaning that it is not dehydrated to a moisture content of 2 wt % or lower, preferably not to a moisture content of 1.5 wt % or lower, more preferably not to a moisture content of 1 wt % or lower.

During and/or after hydrothermal treatment, the crystallinity of the starch, specifically the non-pregelatinized granular starch, is decreased, compared to the crystallinity of native starch, specifically non-pregelatinized granular native starch, preferably the starch, specifically the non-pregelatinized granular starch, at least partially loses its crystallinity. The hydrothermally treated starch, specifically the hydrothermally treated non-pregelatinized granular starch, thus preferably is partially crystalline. Preferably the hydrothermally treated starch, specifically the hydrothermally treated non-pregelatinized granular starch, is 0-99% crystalline, preferably 1-98%, preferably 5-95%, preferably 10-90%.

During hydrothermal treatment in step (ii), preferably a pH of at least 7 is maintained, preferably the pH is maintained above 7, more preferably a pH of at least 7.2 is maintained, most preferably a pH of at least 7.5 is maintained. The possibility of having such neutral to low alkaline pH value as a threshold during hydrothermal treatment is advantageous for achieving less colorization of the resulting starch product, specifically the resulting non-pregelatinized granular starch product. Without wishing to be bound to a specific theory, the inventors believe that the loss in crystallinity during hydrothermal treatment increases the effectiveness of the base in the mechanism of inhibition, hence enabling the usage of lower pH and lower amounts of base than the traditional inhibition process which further results in a better control of the process conditions and in a reduction in color formation.

Without wishing to be bound to a specific theory, it is further believed that the hydrothermal treatment in step (ii) further has the purpose of providing a starch, specifically a non-pregelatinized granular starch, which has a crystallinity of at least partially type A. Consequently, the hydrothermally treated non-pregelatinized granular starch preferably is at least partially of type A crystallinity. Said crystallinity of at least partially type A may be a crystallinity of type A, type C (being a combination of A and B crystallinity) and/or a mixture of types A and C. It is described in the art that when starches of type B crystallinity are subjected to hydrothermal treatment, they partially shift to type A crystallinity, yielding starches being a mixture of type A and C crystallinities and/or type C crystallinity. This is because water delocalizes in the unit cell. It is further described in the art that when starches of C type crystallinity are subjected to hydrothermal treatment, they also partially shift to type A crystallinity, yielding starches of type C and/or type A crystallinity. It is further described in the art that when starches of A type crystallinity are subjected to hydrothermal treatment, they retain their A type of crystallinity. Without wishing to be bound by theory, it is believed that when a hydrothermally treated non-pregelatinized granular starch of at least partially type A crystallinity is thermally inhibited by subjecting it to dehydration and thermal treatment in step (iii), the at least partially type A crystallinity acquired during hydrothermal treatment increases the effectiveness of the base in the mechanism of inhibition, hence enabling the usage of lower pH and lower amounts of base than the traditional inhibition process which further results in a better control of the process conditions and in a reduction in color formation.

The hydrothermally treated starch, specifically the hydrothermally treated non-pregelatinized granular starch, resulting from step (ii) preferably has a moisture content of 2.1-7.5 wt %, more preferably 2.5-7 wt %, preferably 3-6.5 wt %, most preferably 3.5-6 wt %. In step (iii) the hydrothermally treated starch, specifically the hydrothermally treated non-pregelatinized granular starch, resulting from step (ii) is dehydrated to a moisture content of 2 wt % or lower, preferably 1.75 wt % or lower, preferably 1.5 wt % or lower, preferably 1.25 wt % or lower, preferably 1 wt % or lower, preferably lower than 1 wt %. Dehydration, specifically of the hydrothermally treated non-pregelatinized granular starch, is carried out by a means used for dehydration, which may be by forced water removal, such as by heating, for example using an oven, or such as by using a vacuum or an air blower. Preferably, using a vacuum comprises, using sub-atmospheric pressures, e.g. below 1 bar. The oven preferably is a convection oven, operating preferably at a temperature of 115-200° C., more preferably at 120-190° C., even more preferably at 130-180° C., preferably 140-175° C. In an embodiment, the oven operates at a temperature of 140-190° C., preferably 150-190° C., more preferably 150-180° C., even more preferably 155-175° C. Consequently, a means used for dehydration, specifically of the hydrothermally treated non-pregelatinized granular starch, may be by heating to a temperature of 115-200° C., more preferably at 120-190° C., even more preferably at 130-180° C., preferably 140-175° C. In an embodiment, a means used for dehydration, specifically of the hydrothermally treated non-pregelatinized granular starch, may be by heating to a temperature of 140-190° C., preferably 150-190° C., more preferably 150-180° C., even more preferably 155-175° C. Other types of dryers such as a flash dryer, belt dryer, dryer drums, spiral flash dryers, tube bundle dryers, roller dryers, double shaft paddle dryer etc may also suitably be used to perform the dehydration, specifically of the hydrothermally treated non-pregelatinized granular starch, in step (iii).

In one embodiment, the starch, specifically the non-pregelatinized granular starch, more specifically of the hydrothermally treated non-pregelatinized granular starch, from step (ii) is dehydrated to a moisture content of 2 wt % or lower, preferably 1.5 wt % or lower, more preferably 1 wt % or lower, within at most 30 minutes, preferably at most 15 minutes, preferably at most 10 minutes. Where dehydration, specifically of the hydrothermally treated non-pregelatinized granular starch, is desired at fast rates, said moisture content is obtained within at most 5 minutes, preferably 15 seconds to 5 minutes. Related therewith, dehydration, specifically of the hydrothermally treated non-pregelatinized granular starch, in step (iii) may be performed at a rate of 0.2-10 wt % per minute, preferably at a rate of 0.5-7.5 wt % per minute, preferably 0.5-5 wt % per minute, preferably 1-2.5 wt % per minute, to obtain said moisture content. It was found that better breakdown viscosities and viscostabilities are achieved for fast dehydration rates, specifically of the hydrothermally treated non-pregelatinized granular starch. Also higher viscosities during the holding phase may be achieved for fast dehydration rates, specifically of the hydrothermally treated non-pregelatinized granular starch.

In step (iii), the starch, specifically the non-pregelatinized granular starch, is also subjected to a thermal treatment to obtain viscostability of the starch, specifically of the non-pregelatinized granular starch, in particular in combination with a high peak viscosity and hold viscosity. Viscostability, peak viscosity and hold viscosity of the starch, specifically the non-pregelatinized granular starch, are measured by Brabender viscography and/or Rapid ViscoAnalysis (RVA) pasting profiles. Peak viscosity (Vp) is the highest value of viscosity attained by the starch, specifically the non-pregelatinized granular starch, when heated to a temperature, preferably to 80-99° C., more preferably to 82-97° C., even more preferably 82-92° C., especially 85° C. or 90° C. in RVA and/or Brabender viscography under neutral conditions, preferably pH 5-7.5, or to 90-99° C., especially 92-97° C., most especially 95° C. in RVA and/or Brabender viscography under acid conditions, preferably pH 2.9-3.1. Hold viscosity (Vh) is the viscosity of said starch, specifically said non-pregelatinized granular starch, after said temperature is held constant for 3-20 minutes, preferably 3.5-15 minutes, more preferably 4-12 minutes, most preferably 4.5-11 minutes, especially 5-10 minutes. During this holding period, viscosity of the starch, specifically the non-pregelatinized granular starch, may change compared to its peak viscosity, so the viscosity at the end of this holding period is the hold viscosity (Vh). Viscostability is a measure of the change in peak viscosity value of the starch, specifically the non-pregelatinized granular starch, during the holding period, where the starch, specifically the non-pregelatinized granular starch, is viscostable if its peak viscosity Vp does not substantially change during the holding period, meaning that the hold viscosity Vh of the starch, specifically the non-pregelatinized granular starch, equals or is within 10% of the peak viscosity Vp of said starch, preferably equals or is within 5% of the peak viscosity Vp of said starch, more preferably equals or is within 2% of the peak viscosity Vp of said starch. To measure viscostability, the breakdown viscosity is defined as $((Vp-Vh)/Vp)*100\%$, so that a substantially zero % breakdown means that the starch, specifically the non-pregelatinized granular starch, is viscostable. According to the invention, viscostability means that the breakdown viscosity is less than 5%, more preferably less than 1%, even more preferably less than 0.5%, most preferably 0%. According to the invention, starches, specifically non-pregelatinized granular starches, with a breakdown viscosity of 10% or higher, particularly 20% or higher, more particularly 30% or higher are not considered to have achieved viscostability and are hence not considered to be viscostable. Viscostability is indicative of the acquired degree of inhibition (cross-linking). Peak viscosity is linked to the ease of cooking of the starch, specifically the non-pregelatinized granular starch: a high peak viscosity means that the starch is easy to cook.

According to the invention, after thermal treatment in step (iii) and/or during the hold phase, when measured under neutral conditions, preferably at a pH of 5-7.5, a viscosity of at least 50%, preferably at least 55%, preferably at least 60%, preferably at least 65%, more preferably at least 70%, preferably at most 110%, more preferably at most 105%, more preferably at most 100%, more preferably at most 95%, more preferably at most 90%, more preferably at most 85%, more preferably at most 80% of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity of less than 5%, more preferably less than 1%, even more preferably less than 0.5%, most preferably 0%. Particularly, the thermally inhibited starch, specifically thermally inhibited non-pregelatinized granular starch, does not have a breakdown viscosity of 10% or higher, particularly 20% or higher, more particularly 30% or higher. According to the invention, after thermal treatment in step (iii) and/or during the hold phase, when measured under acid conditions, preferably at a pH of 2.9-3.1, a viscosity of at least 40%, preferably at least 45%, preferably at least 50%, preferably at most 100%, more preferably at most 95%, more preferably at most 90%, more preferably at most 85%, more preferably at most 80%, more preferably at most 75%, more preferably at most 70% of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity of less than 5%, more preferably less than 1%, even more preferably less than 0.5%, most preferably 0%. Particularly, the thermally inhibited starch, specifically thermally inhibited non-pregelatinized granular starch, does not have a breakdown viscosity of 10% or higher, particularly 20% or higher, more particularly 30% or higher.

Particularly, for starches, specifically non-pregelatinized granular starches, being (waxy) root and/or (waxy) tuber starches, especially for (waxy) potato starch and/or (waxy) tapioca starch, more especially for potato starch, most especially for waxy potato starch, after thermal treatment in step (iii) and/or during the hold phase, when measured under neutral conditions, preferably at a pH of 5-7.5, a viscosity of 50-85%, preferably 55-80%, preferably 60-75%, preferably 65-70% of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. Particularly, for starches, specifically non-pregelatinized granular starches, being (waxy) root and/or (waxy) tuber starches, especially for (waxy) potato starch and/or (waxy) tapioca starch, more especially for potato starch, most especially for waxy potato starch, after thermal treatment in step (iii) and/or during the hold phase, when measured under acid conditions, preferably at a pH of 2.9-3.1, a viscosity of 40-75%, preferably 45-70%, preferably 50-65%, preferably 52-60% of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

Particularly, for starches, specifically non-pregelatinized granular starches, being maize or corn starch, after thermal treatment in step (iii) and/or during the hold phase, when measured under neutral conditions, preferably at a pH of 5-7.5, a viscosity of at least 90%, preferably at least 95%, more preferably at least 100%, preferably at most 110%, more preferably at most 105% of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. Particularly, for starches, specifically non-pregelatinized granular starches, being maize or corn starch, after thermal treatment in step (iii) and/or during the hold phase, when measured under acid conditions, preferably at a pH of 2.9-3.1, a viscosity of at least 70%, preferably at least 75%, preferably at least 80%, preferably at least 85%, more preferably at least 90%, preferably at most 100%, more preferably at most 95%, of the viscosity of the native starch, specifically of the non-pregelatinized granular native starch, is obtained in the thermally inhibited starch, specifically thermally inhibited non-pregelatinized granular starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

The thermal treatment in step (iii) is conducted in a system or reactor, which may be the same or different as the system or reactor used for dehydration, specifically of the hydrothermally treated non-pregelatinized granular starch. The thermal treatment (iii) involves a temperature of 130-190° C., preferably of 140-185° C., more preferably of 150-180° C., most preferably of 160-180° C., preferably 160-170° C. In an embodiment, the thermal treatment (iii) involves a temperature of 140-190° C., preferably 150-190° C., more preferably 150-180° C., even more preferably 155-175° C. The thermal treatment (iii) preferably involves heating the starch, specifically the non-pregelatinized granular starch, to said temperature. If the means used for dehydration, specifically of the hydrothermally treated non-pregelatinized granular starch, is heating, then one embodiment of the invention is that thermal treatment and dehydration, specifically of the hydrothermally treated non-pregelatinized granular starch, are carried out by the same means. The temperature used for dehydration, specifically of the hydrothermally treated non-pregelatinized granular starch, by heating may be the same or different from the temperature used for thermal treatment, more particularly the temperature used for dehydration, specifically of the hydrothermally treated non-pregelatinized granular starch, by heating may be the same or lower than the thermal treatment temperature, most preferably the temperature used for dehydration, specifically of the hydrothermally treated non-pregelatinized granular starch, by heating is the same or 1-20° C. lower, preferably 2-15° C. lower, more preferably 3-10° C. lower, most preferably 4-7° C. lower, as the thermal treatment temperature. Another embodiment of the invention is that different means are used for dehydration, specifically of the hydrothermally treated non-pregelatinized granular starch, as for the thermal treatment. During thermal treatment, the starch, specifically the non-pregelatinized granular starch, preferably has a moisture content of 2 wt % or lower, preferably 1.75 wt % or lower, preferably 1.5 wt % or lower, preferably 1.25 wt % or lower, preferably 1 wt % or lower, preferably lower than 1 wt %, most preferably lower than during the dehydration, specifically of the hydrothermally treated non-pregelatinized granular starch. Thermal treatment may be carried out as a direct continuation of the dehydration, specifically of the hydrothermally treated non-pregelatinized granular starch, meaning that thermal treatment and dehydration, specifically of the hydrothermally treated non-pregelatinized granular starch, are carried out in one single step, or thermal treatment may be carried out as a separate step from the dehydration step, specifically of the hydrothermally treated non-pregelatinized granular starch.

Viscostability is obtained after at least 30 minutes, preferably at least 1 hour, preferably at least 1.5 hours of heating in the thermal treatment. Preferably viscostability is obtained after 1-4 hours of heating in the thermal treatment, more preferably 1-3.5 hours, even more preferably 1.5-3 hours, most preferably 2-3 hours. Consequently the thermal treatment in step (iii) may be conducted in total for at least 30 minutes, preferably at least 1 hour, preferably at least 1.5 hours, preferably 1-4 hours, more preferably 1-3.5 hours, even more preferably 1.5-3 hours, most preferably 2-3 hours. Particularly, the thermal treatment in step (iii) may be conducted in total for at most 3 hours, more particularly less than 3 hours, even more particularly at most 2.9 hours, preferably less than 2.9 hours, preferably at most 2.75 hours, preferably less than 2.75 hours. In other words: the thermal treatment in step (iii) is preferably not conducted for 3 hours or longer, more preferably not longer than 3 hours, more particularly not 2.9 hours or longer, preferably not longer than 2.9 hours, even more particularly not 2.75 hours or longer, preferably not longer than 2.75 hours.

The total treatment time of step (iii), comprising the dehydration, specifically of the hydrothermally treated non-pregelatinized granular starch, and the thermal treatment, is at least 30 minutes, preferably at least 1 hour, preferably 1-5 hours, more preferably 1-4.5 hours, more preferably 1.5-4 hours, most preferably less than 3 hours. Particularly, the total treatment time of step (iii) is less than 2.75 hours. The total treatment time of the hydrothermal treatment (ii), specifically to obtain a hydrothermally treated non-pregelatinized granular starch, and thermal treatment (iii) may range from a few minutes to several hours, for example from 15 minutes to 8 hours, preferably from 30 minutes to 6 hours, more preferably 1-5 hours, even more preferably 1.5-4.5 hours, most preferably 2-4 hours.

It is preferred that the final pH at the end of step (iii), meaning the pH when viscostability is obtained in step (iii), does not decrease below 6, more preferably not below 6.5, preferably not below 7. The final pH is preferably in the range of 6.5-8.5, more preferably between 7-8, even more preferably between 7.1-8, more preferred not below 7.1, even more preferably is in the range of 7.1-7.8, most particularly 7.1-7.5 at the end of step (iii), meaning the pH when viscostability is obtained in step (iii). It is further preferred that no solvent, specifically no solvent other than water, preferably no alcohol or alcoholic medium is present in the process of the invention, more specifically in step (iii), even more specifically during the thermal treatment in step (iii).

The process of the invention further comprises a step (iv) of cooling and optionally further processing the starch, specifically the non-pregelatinized granular starch. Cooling may be conducted at room temperature and atmospheric pressure, optionally at air. The optional further processing of the starch, specifically the non-pregelatinized granular starch in step (iv) may comprise for example washing and/or drying the heat-treated starch, specifically the heat-treated non-pregelatinized granular starch. Other optional further processing treatments may include pH adjustment or mixing with other ingredients.

The process of the invention can be carried out in conventional, relatively inexpensive equipment, such as a reaction vessel, preferably a closed reaction vessel, dextrinizer, oven, plate dryer, Loedige mixer, or paddle reactor, preferably in combination with water-removing means, such as a blower or a vacuum device. Use of more complex equipment such as fluidized bed reactors is therefore not preferred.

The process of the invention results in a thermally inhibited starch, specifically a thermally inhibited non-pregelatinized granular starch. The invention consequently also relates to a thermally inhibited starch, specifically a thermally inhibited non-pregelatinized granular starch, obtainable by a process according to the invention. Said thermally inhibited starch, specifically said thermally inhibited non-pregelatinized granular starch, typically has viscostability at shear (preferably at an applied shear of 2000 $s^{-1}$ or less), neutral and acidic conditions, preferably at neutral and acidic conditions, preferably at pH 2.5-8, more preferably 3-7.5. As explained before, indicative of viscostability is a breakdown of viscosity of substantially zero %, meaning that the viscosity value nearly does not change. Viscostability under shear conditions thus means that upon cooking and applying shear to the starch, specifically the non-pregelatinized granular starch, the starch granule remains stable and does not fragment, hence retaining the viscosity of the starch, specifically of the non-pregelatinized granular starch. Typically, said thermally inhibited starch, specifically said thermally inhibited non-pregelatinized granular starch, has viscostability under a shear typically applied to food products, more specifically under an applied shear of 0-2000 $s^{-1}$, preferably 1-1500 $s^{-1}$, more preferably 10-1000 $s^{-1}$, even more preferably 30-750 $s^{-1}$, preferably 50-500 $s^{-1}$, preferably 75-300 $s^{-1}$. Typically, said thermally inhibited starch, specifically said thermally inhibited non-pregelatinized granular starch, has viscostability at pH conditions typically present in food products, more specifically at pH 2.5-7.5, preferably 2.7-7.2, more preferably 3-7, more preferably 3.5-6.5, preferably 3.7-6, preferably 4-5.5, preferably 4.2-5. Even if kept for long time periods, preferably 0-36 months, preferably 1-24 months, preferably 2-18 months, preferably 3-12 months, preferably 4-8 months, preferably 4-6 months, at said pH conditions, the starch, specifically the non-pregelatinized granular starch, remains stable and is not degraded. Consequently, the starch, specifically the non-pregelatinized granular starch, according to the invention has a shelf life of 0-36 months, preferably 1-24 months, preferably 2-18 months, preferably 3-12 months, preferably 4-8 months, preferably 4-6 months, preferably at said pH conditions, implying that during said shelf life the starch, specifically the non-pregelatinized granular starch, quality, especially viscosity, and appearance is not affected. The thermally inhibited starch, specifically the thermally inhibited non-pregelatinized granular starch, has a stable viscosity compared to native starch, specifically non-pregelatinized granular native starch, under both acid and neutral conditions, as a result of crosslinking of the starch. Typically, at said stable viscosity, the thermally inhibited starch, specifically the thermally inhibited non-pregelatinized granular starch, retains a relatively large part of the peak viscosity of the native starch, specifically the non-pregelatinized granular native starch. The viscosity during the hold phase of said thermally inhibited starch, specifically said thermally inhibited non-pregelatinized granular starch, when measured under neutral conditions, preferably at a pH of 5-7.5, can be of at least 50%, preferably at least 55%, preferably at least 60%, preferably at least 65%, more preferably at least 70%, preferably at most 110%, more preferably at most 105%, more preferably at most 100%, more preferably at most 95%, more preferably at most 90%, more preferably at most 85%, more preferably at most 80% of the peak viscosity of the corresponding native starch, specifically the corresponding non-pregelatinized granular native starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. The viscosity during the hold phase of said thermally inhibited starch, specifically said thermally inhibited non-pregelatinized granular starch, when measured under acid conditions, preferably at a pH of 2.9-3.1, a viscosity of at least 40%, preferably at least 45%, preferably at least 50%, more preferably at least 52%, preferably at most 100%, more preferably at most 95%, more preferably at most 90%, more preferably at most 85%, more preferably at most 80%, more preferably at most 75%, more preferably at most 70% of the peak viscosity of the corresponding native starch, specifically the corresponding non-pregelatinized granular native starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

Particularly, for thermally inhibited starches, specifically thermally inhibited non-pregelatinized granular starches, being (waxy) root and/or (waxy) tuber starches, especially (waxy) potato starch and/or (waxy) tapioca starch, more especially potato starch, most especially waxy potato starch, the viscosity during the hold phase, when measured under neutral conditions, preferably at a pH of 5-7.5, is of 50-85%, preferably 55-80%, preferably 60-75%, preferably 65-70% of the peak viscosity of the corresponding native starch, specifically the corresponding non-pregelatinized granular native starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. Particularly, for thermally inhibited starches, specifically thermally inhibited non-pregelatinized granular starches, being (waxy) root and/or (waxy) tuber starches, especially (waxy) potato starch and/or (waxy) tapioca starch, more especially potato starch, most especially waxy potato starch, the viscosity during the hold phase, when measured under acid conditions, preferably at a pH of 2.9-3.1, is of 40-75%, preferably 45-70%, preferably 50-65%, preferably 52-60% of the peak viscosity of the corresponding native starch, specifically the corresponding non-pregelatinized granular native starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

Particularly, for thermally inhibited starches, specifically thermally inhibited non-pregelatinized granular starches, being maize or corn starch, the viscosity during the hold phase, when measured under neutral conditions, preferably at a pH of 5-7.5, is of at least 80%, more preferably at least 90%, especially at least 95%, more particularly at least 100%, preferably at most 110%, more preferably at most 105%, of the peak viscosity of the corresponding native starch, specifically the corresponding non-pregelatinized granular native starch, where the final viscosity can even be higher than the initial viscosity, e.g. 105% or even 110% of the initial viscosity or higher, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. Particularly, for thermally inhibited starches, specifically thermally inhibited non-pregelatinized granular starches, being maize or corn starch, the viscosity during the hold phase, when measured under acid conditions, preferably at a pH of 2.9-3.1, is of at least 70%, preferably at least 75%, preferably at least 80%, preferably at least 85%, more preferably at least 90%, preferably at most 100%, more preferably at most 95% of the peak viscosity of the corresponding native starch, specifically the corresponding non-pregelatinized granular native starch, preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

In absolute terms, the viscosity of the thermally inhibited starch, specifically the thermally inhibited non-pregelatinized granular starch, according to the invention, preferably corn or maize or potato starch, more preferably for (waxy) root and/or (waxy) tuber starches, more preferably for (waxy) potato starch and/or (waxy) tapioca starch, more preferably for potato starch, most preferably waxy potato starch, during the holding period under neutral conditions of pH 5-7.5, is at least 600 mPas, preferably at least 700 mPas, preferably at least 800 mPas, more preferably at least 1000 mPas, even more preferably at least 1200 mPas, preferably at least 1400 mPas, preferably at least 1600 mPas, preferably at least 1700 mPas, preferably at least 1800 mPas, most preferably at least 1900 mPas (as measured using a neutral Rapid ViscoAnalysis viscograph at 5 wt. % starch, specifically non-pregelatinized granular starch, in water at 85° C.), preferably combined with viscostability, more preferably a breakdown viscosity of less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher. The viscosity of the thermally inhibited starch, specifically the thermally inhibited non-pregelatinized granular starch, according to the invention, preferably corn or maize or potato starch, for (waxy) root and/or (waxy) tuber starches, more preferably for (waxy) potato starch and/or (waxy) tapioca starch, more preferably potato starch, most preferably waxy potato starch, during the holding period under acid conditions of pH 2.9-3.1 is at least 400 mPas, preferably at least 500 mPas, preferably at least 600 mPas, preferably at least 700 mPas, even more preferably at least 800 mPas, preferably at least 850 mPas, preferably at least 900 mPas, preferably at least 1000 mPas, preferably at least 1100 mPas, most preferably at least 1200 mPas (as measured using an acid Rapid ViscoAnalysis viscograph at 5 wt % starch, specifically non-pregelatinized granular starch, in disodium hydrogen phosphate buffer with citric acid at 95° C.), preferably combined with viscostability, more preferably a breakdown viscosity less than 5%, more preferably less than 1%, even more preferably less than 0.5%, most preferably 0%. Particularly, said thermally inhibited starch, specifically said thermally inhibited non-pregelatinized granular starch, does not have a breakdown viscosity of 10% or higher, particularly 20% or higher, more particularly 30% or higher.

The thermally inhibited starch, specifically the thermally inhibited non-pregelatinized granular starch, preferably a (waxy) root and/or (waxy) tuber starch, preferably a (waxy) potato starch and/or (waxy) tapioca starch, more preferably a potato starch, more preferably a waxy potato starch, according to the invention also has a whiteness value L of at least 80, preferably at least 85, more preferably at least 90 on the Commission Internationale de l'Éclairage (CIE) scale, wherein whiteness is measured using UV emission at 420-720 nm. The CIE scale is a scale of 0-100, wherein 100 represents absolute whiteness. Whiteness can be determined by conventional equipment measuring UV emissions in the range of 420-720 nm. As examples a Konica Minolta Chroma Meter CR-400 or CR-410, a Reflectance Colorimeter of HunterLab (Labscan II 0/45) or whiteness meters available from Kett can be suitably used. The whiteness value of the thermally inhibited starch, specifically the thermally inhibited non-pregelatinized granular starch, according to the invention is a very good whiteness value, allowing the said starch, specifically said non-pregelatinized granular starch, of the invention to be used without further purification. Alcohol (e.g. ethanol) removal, optional washing and drying are sufficient for arriving at a product which is ready for use. Also, the thermally inhibited starch, specifically the thermally inhibited non-pregelatinized granular starch, of the invention can readily be applied in food products while retaining their normal color. With no colorization of the food product caused by the starch, specifically the non-pregelatinized granular starch, according to the invention, customer appreciation of the products appearance is maintained.

The hydrothermal treatment, specifically to obtain a hydrothermally treated non-pregelatinized granular starch, makes less stringent conditions possible. The resulting product has an improved whiteness value L. Preferably, the resulting product has a whiteness value L of at least 80, more preferably at least 85, even more preferably at least 90.

The thermally inhibited (or moderately cross-linked) starches, specifically the thermally inhibited (or moderately cross-linked) non-pregelatinized granular starches, according to the invention can suitably be used in applications in which increased and stable viscosity are required, without being limited by the pH of said application. Because the thermally inhibited starches, specifically the thermally inhibited non-pregelatinized granular starches, according to the invention have viscostability under shear conditions and at acid and neutral pH, preferably at acid and neutral pH, these applications may accordingly have pH values typical for food products within the range of pH 2.5-8, preferably 3-7.5 all while displaying viscostable behavior. Even if kept for long time periods, preferably 1-36 months, preferably 2-24 months, preferably 3-18 months, at said pH conditions, the starch, specifically the non-pregelatinized granular starch, remains stable and does not degrade. Consequently, the starch, specifically the non-pregelatinized granular starch, according to the invention has a corresponding shelf life, implying that during said shelf life the starch, specifically the non-pregelatinized granular starch quality, especially viscosity, and appearance is not affected. Accordingly, these applications may be subjected to shear typically applied to food products, specifically shear of up to 2000 $s^{-1}$, preferably 50-1500 $s^{-1}$ while displaying viscostable behavior.

The invention also relates to the use of the thermally inhibited starch, specifically the thermally inhibited non-pregelatinized granular starch, according to the invention, in a food product, preferably having a pH in the range of 2.5-8, more preferably 3-7.5, preferably as a thickener or for providing a pulpy texture. The starches, specifically the non-pregelatinized granular starches, can for instance be used in soups, purees, gravies, sauces, microwave meals, fruit filling, vegetable filling, puddings, honeys, syrups, jams and jellies, meat products, egg products, fish and shellfish products, dairy products, fat and oil based products, such as butters, margarines, nut and olive based products, such as tapenades and nutbutter, potato based products, such as crisps and chips, legume based products, grain based products such as rice, corn, buckwheat, rye, oat, barley, wheat products, like breads, pastries, pancakes, polenta, granolas and pastas, baby foods and deep fried foods. The starches, specifically the non-pregelatinized granular starches, produced according to the invention have the important advantage of not being chemically modified.

The invention also pertains to the use of the thermally inhibited starches, specifically the thermally inhibited non-pregelatinized granular starches, as described herein as a food additive, such as thickeners and stabilisers, e.g at levels of between 0.1 and 5 wt. % on total dry weight basis of the particular food product. Such food products containing the treated starches, specifically the non-pregelatinized granular treated starches, as defined herein, are also an embodiment of the invention.

The invention is further illustrated by the following non-limiting examples:

EXAMPLES

Materials and Methods
1.1 Preparation of Alkaline Non-Pregelatinized Granular Starch Samples Eliane waxy potato starch (AVEBE) (a non-pregelatinized granular starch) was suspended in water (100 g of starch in 400 mL of water) under constant stirring with a magnetic stirrer. NaOH solution (0.1 mol/L) (Aldrich) was used to adjust the pH to the required initial pH (9, 10, 11) within 15 min. After 1 h of stirring, the pH was measured again and adjusted, if necessary. The suspension was then filtered through a paper filter (Whatman No 4, Whatman International, England). The (non-pregelatinized granular) starch cake was dried overnight at 40° C. in an oven (Memmert, Germany). The dried cake was ground using a Grindomix GM200 (Retsch, Germany). Final moisture level is about 10%.

1.2 Traditional Thermal Inhibition Process

Prior to the thermal treatment, the alkaline non-pregelatinized granular starch (initial pH 9, 10, 11; initial moisture content 10 wt %) was dehydrated in an convection oven at a temperature of 80° C. to reach a final moisture level of 1% or less (substantially anhydrous (1%) to anhydrous (<1%)).

For the thermal treatment dehydrated alkaline non-pregelatinized granular starch was placed in an aluminium dish and placed in a convection oven (Mettler, Germany) at a temperature of 165° C. for approximately 1, 2 or 3 hours. The inhibition reaction was stopped by removing the dish from the oven and allowing the non-pregelatinized granular starch to cool at room temperature and atmospheric pressure, optionally at air. A thermally inhibited non-pregelatinized granular starch was obtained. Final pH was measured.

1.3 Thermal Inhibition Process According to the Invention

For the hydrothermal treatment, alkaline non-pregelatinized granular starch (initial pH 9, 10, 11) with a moisture content of 10 wt % (relative to dry starch) was put in a 200 ml glass flask and closed with a cap. The starch containing flask was put in a roller oven and subjected to a temperature of 120, 130 or 140° C. at equilibrium steam pressure for 30 or 60 minutes. A hydrothermally treated non-pregelatinized granular starch was obtained.

The dehydration of the hydrothermally treated non-pregelatinized granular starch to moisture contents of 1 wt % or lower and the thermal treatment were combined. For this, non-pregelatinized granular starch that had been subjected to the hydrothermal treatment (i.e. hydrothermally treated non-pregelatinized granular starch) was placed in an aluminium dish and placed in a convection oven (Mettler, Germany) at a temperature of 165° C. for 2 or 3 hours. The inhibition reaction was stopped by removing the dish from the oven and allowing the (non-pregelatinized granular) starch to cool at room temperature and atmospheric pressure, optionally at air. A thermally inhibited non-pregelatinized granular starch was obtained. Final pH was measured.

1.4 pH Measurements pH was measured in at 20% dry solid (non-pregelatinized granular) starch suspension in demineralized water.

1.5 Viscosity Measurements

For measuring viscosity behavior, viscographs have been recorded by acid and neutral Brabender viscography for the thermally inhibited non-pregelatinized granular starch products from the traditional process (obtained as described in section 1.2) and by acid and neutral Rapid ViscoAnalysis (RVA) pasting profiles for the thermally inhibited non-pregelatinized granular starch products from the process according to the invention (obtained as described in section 1.3). The conditions as prescribed by the manufacturer (detailed below) for starch viscosity measurements by the Brabender and RVA techniques have been followed. The results of Brabender viscographs and RVA pasting profiles are readily comparable. Breakdown viscosity was calculated as: $((V_p-V_h)/V_p)*100\%$, where $V_p$ is the measured peak viscosity of the non-pregelatinized granular starch and $V_h$ is the measured holding viscosity of said non-pregelatinized granular starch.

1.5.1 Preparation of Buffer Solution for Acid Viscograph Measurements

For the acid Brabender viscograph and acid RVA pasting profile, the following buffer solution was prepared: 5.84 g of sodium phosphate, dibasic, anhydrous (J.T. Baker #3828) and 16.69 g of citric acid, monohydrate (J.T. Baker #0110) were dissolved in 977.47 grams of distilled or deionized water.

1.5.2 Neutral and Acid Brabender Viscographs—Thermally Inhibited Non-Pregelatinized Granular Starch Via Traditional Process Neutral and acid Brabender viscographs were measured as follows: 5.5 g of dry non-pregelatinized granular starch samples was mixed with 104.5 g of demineralized water (neutral) or the buffer solution at pH 3.0 (error margin of 0.1 units) (acid) in a Brabender cup and placed in the measuring equipment. The Brabender temperature was set at 35° C. and the stirring speed at 250 rpm. Within a time frame of 11 min, the temperature was raised to 90° C. (neutral) or 95° C. (acid). This temperature was held for 5 min (neutral) or 10 min (acid). Then the non-pregelatinized granular starch paste was cooled to 35° C. in 11 min. After 5 min at 35° C. the measurement was finished. The measuring was performed in a range of 235 cmg.

1.5.3 Neutral and Acid RVA Pasting Profiles—Thermally Inhibited Non-Pregelatinized Granular Starch Via the Process According to the Invention Neutral and acid RVA pasting profiles were determined by subjecting a 5% non-pregelatinized granular starch suspension (dry mass base) in demineralized water (neutral) or in the buffer solution at pH 3.0 (error margin of 0.1 units) (acid) to a temperature profile using a Rapid Visco Analyser (RVA super 4, Newport Scientific). For neutral RVA, the stirring speed was 160 rpm and the temperature profile: 25° C. for 1 min; heating to 85° C. in 5 min; hold at 85° C. for 10 min; cooling to 25° C. in 10 min; hold at 25° C. for 5 min. For acid RVA, the stirring speed was 250 rpm and the temperature profile: 35° C. for 1 min; heating to 95° C. in 12 min; hold at 95° C. for 10 min; cooling to 25° C. in 11:40 min; hold at 25° C. for 5 min. Pasting temperature (Tp), peak viscosity (Vp), hold viscosity (Vh) and final viscosity (Vf) were determined using Thermocline for Windows Software.

1.6 X-Ray Analysis of Crystallinity of Non-Pregelatinized Granular Starch after Hydrothermal Treatment (i.e. Hydrothermally Treated Non-Pregelatinized Granular Starch) According to the Invention X-Ray Diffractograms were measured by X-ray diffraction (XRD) to determine the crystallinity of untreated native Eliane waxy potato starch (as a control) (i.e. a non-pregelatinized granular native starch) and Eliane waxy potato starch (initial pH of 9; initial moisture content of 15 wt %) (a non-pregelatinized granular starch) that had been subjected to hydrothermal treatment (i.e. hydrothermally treated non-pregelatinized granular starch) at 120° C. during 60 minutes at equilibrium steam pressure. Wide angle X-ray scattering (WAXS) powder diffractograms were recorded on a Bruker D2 diffractometer in the reflection geometry in the angular range 4-35° (2θ), with a step size of 0.02° (2θ) and an acquisition time of 2.0 s per step. The Co Kα1 radiation (=1.7902 Å; X-ray tube is air cooled) from the anode, was generated at 30 kV and 10 mA. The diffractometer was equipped with a 1 mm divergence slit, a 3 mm scatter slit, a Ni β-filter and a 0.5 mm knife edge above the sample stage (enabling measurement at low angle, i.e. from 4° 2θ upwards).

1.7 Differential Scanning Calorimetry (DSC) Analysis of Non-Pregelatinized Granular Starch after Hydrothermal Treatment (i.e. Hydrothermally Treated Non-Pregelatinized Granular Starch) According to the Invention DSC graphs were recorded for untreated native Eliane waxy potato starch (as a control) (i.e. a non-pregelatinized granular native starch) and for Eliane waxy potato starch samples (i.e. non-pregelatinized granular starch samples) that had been subjected to hydrothermal treatment (i.e. hydrothermally treated non-pregelatinized granular starch) at different pH conditions (initial pH 9, 10 or 11), different hydrothermal treatment times (30 and 60 minutes), different temperatures (120 or 130° C.) at equilibrium steam pressure.

DSC was performed with a TA Instruments Q200 calorimeter. Approximately 40 μg of a (non-pregelatinized granular) starch suspension of 20% dry mass was weighted into a pressure pan which was hermetically sealed. The pans were heated at 7.5° C./min from 2 to 160° C. and the total heat flow is determined. The onset and peak temperature of melting as well as the melting enthalpy were determined by Universal Analysis 2000 software.

1.8 Color Analysis of the Thermally Inhibited Non-Pregelatinized Granular Starch According to the Invention Color analysis of the non-pregelatinized granular starch products was performed using a Konica Minolta Chroma Meter CR-410 with a D65 illumination condition (CIE standard). The measurement area was 50 mm and the illumination area was 53 mm (suitable for the starch material). The observer condition was a 2° measuring angle (CIE standard). Before use the measurement was calibrated using a colour standard tile. The results of the measurements are recalculated and presented in L values. The L-value is a correlate of lightness scaled between 0 (black) and 100 (white) as defined e.g. by the CIE, Commission Internationale de l'Éclairage.

Example 1: Thermal Inhibition Via the Traditional Process (without Hydrothermal Treatment) (i.e. Non-Hydrothermally Treated Non-Pregelatinized Granular Starch)

Compared to the Process According to the Invention (with Hydrothermal Treatment) (i.e. Hydrothermally Treated Non-Pregelatinized Granular Starch)

Because viscographs measured under acid conditions showed that non-pregelatinized granular starch inhibited by the traditional process—in contrast to those of the invention—lost stability in acid environment (see Example 2), viscographs measured under neutral conditions were chosen to allow for a fair comparison of breakdown viscosities.

TABLE 1

Results thermal inhibition via the traditional process (no hydrothermal treatment) (i.e. non-hydrothermally treated non-pregelatinized granular starch)

| Initial pH | Initial moisture level | Temperature (° C) | Time (h) | % breakdown in viscosity | Final pH |
|---|---|---|---|---|---|
| 9 | 10 | 165 | 1 | >10 | 7.5 |
| 9 | 10 | 165 | 2 | >10 | 7.2 |
| 9 | 10 | 165 | 3 | >10 | 6.9 |
| 10 | 10 | 165 | 1 | >10 | 7.7 |
| 10 | 10 | 165 | 2 | >10 | 7.4 |
| 10 | 10 | 165 | 3 | >10 | 7.2 |
| 11 | 10 | 165 | 1 | >10 | 8.1 |
| 11 | 10 | 165 | 2 | >10 | 7.6 |
| 11 | 10 | 165 | 3 | 0 | 7.3 |

TABLE 2

Results thermal inhibition via the process according to the invention (with hydrothermal treatment) (i.e. hydrothermally treated non-pregelatinized granular starch)

| Initial pH | T hydrothermal treatment (° C.) | Time hydrothermal treatment (min) | T thermal treatment (° C.) | Time thermal treatment (min) | Breakdown viscosity (%) | Final pH |
|---|---|---|---|---|---|---|
| 11 | 130 | 30 | 165 | 120 | 0 | 7.4 |
| 11 | 130 | 30 | 165 | 120 | 0 | |
| 11 | 140 | 30 | 165 | 120 | 0 | |
| 10 | 120 | 30 | 165 | 120 | 0 | 7.1 |
| 9 | 120 | 60 | 165 | 120 | 0 | 7.1 |
| 9 | 120 | 60 | 165 | 120 | 0 | |
| 9 | 130 | 60 | 165 | 180 | 0 | |

As can be seen from table 1, with the traditional thermal inhibition process (without heat moisture treatment), 0% breakdown viscosity (i.e. viscostability) could not be achieved for any of the samples, except for the sample at an extra high initial pH of 11 and at an extended thermal treatment time of 3 hours. However, with the thermal inhibition process according to the invention (with hydrothermal treatment (i.e. hydrothermally treated non-pregelatinized granular starch), table 2), 0% breakdown viscosity (i.e. viscostability) was reached at all initial pH values, including less alkaline initial pHs, and at much shorter thermal treatment times. Since the hydrothermal treatment time to obtain hydrothermally treated non-pregelatinized granular starch was 30 minutes in most cases in table 2, the overall reaction time of the process was reduced compared to the traditional thermal inhibition process. Other examples in table 2 show that extended hydrothermal treatment times to obtain hydrothermally treated non-pregelatinized granular starch (of 1 hour) and/or longer thermal treatment times (of 3 hours), also work to attain viscostability.

Figure 1B:
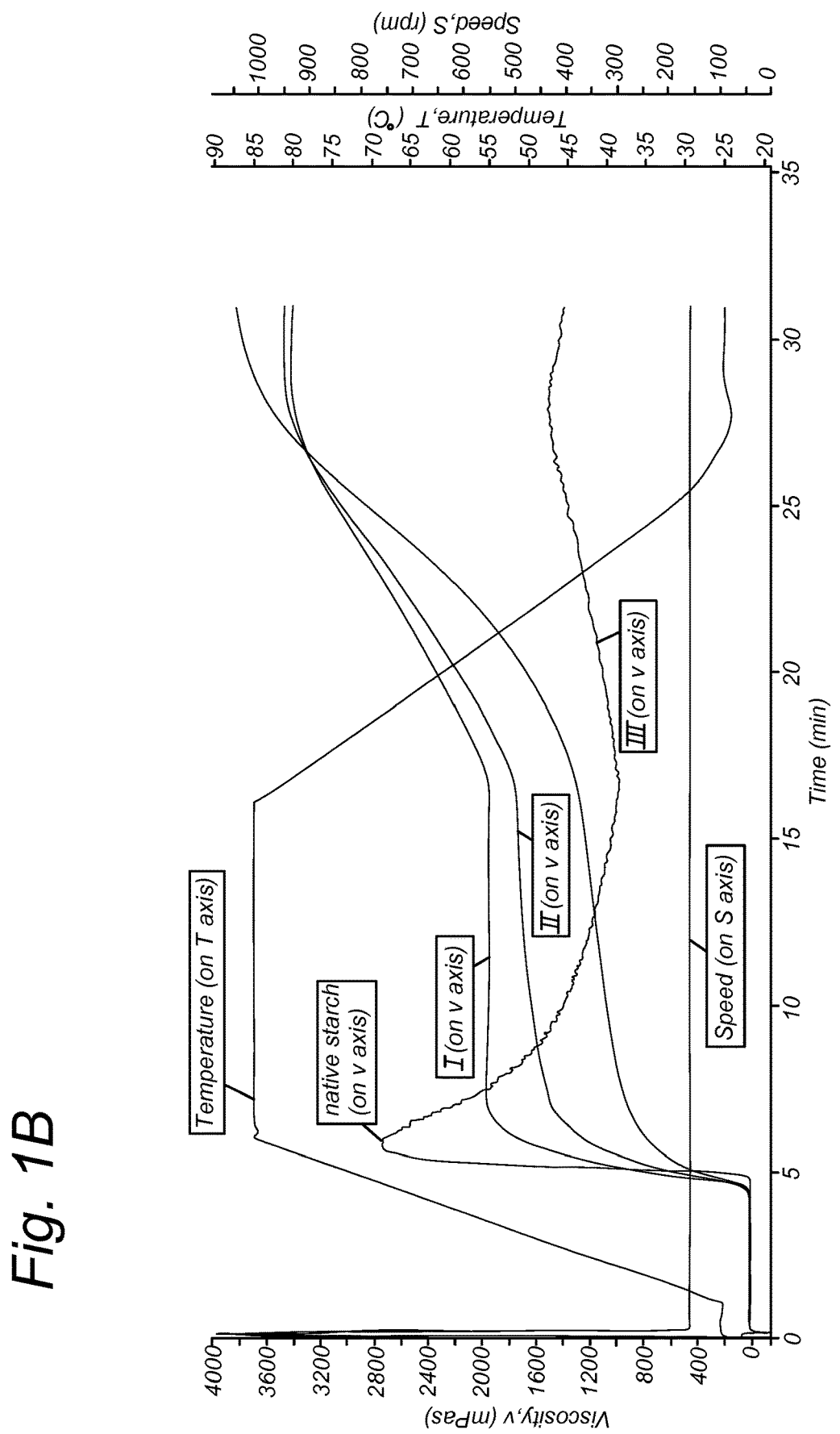
Figure 1C:
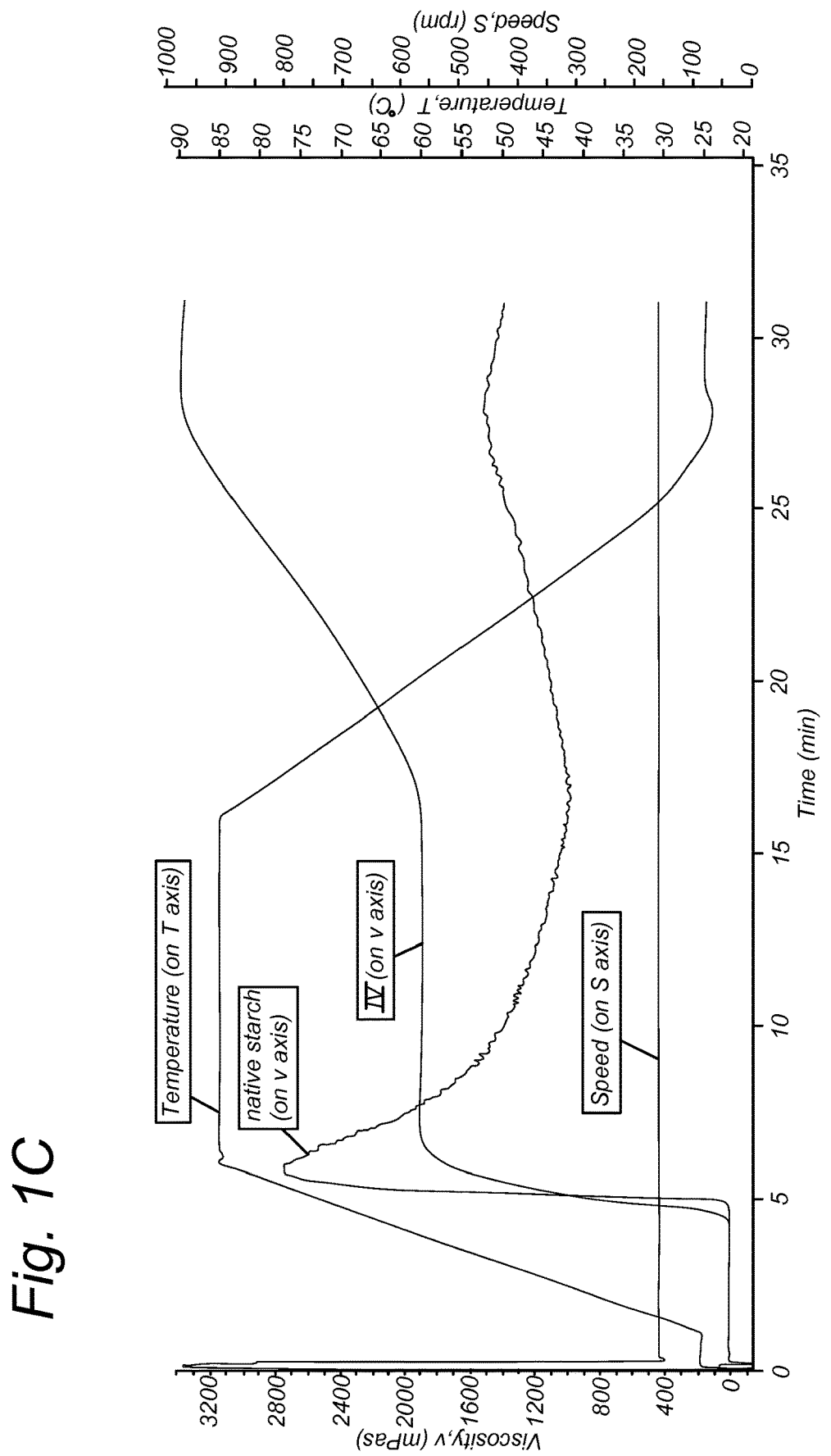
Figure 1D:
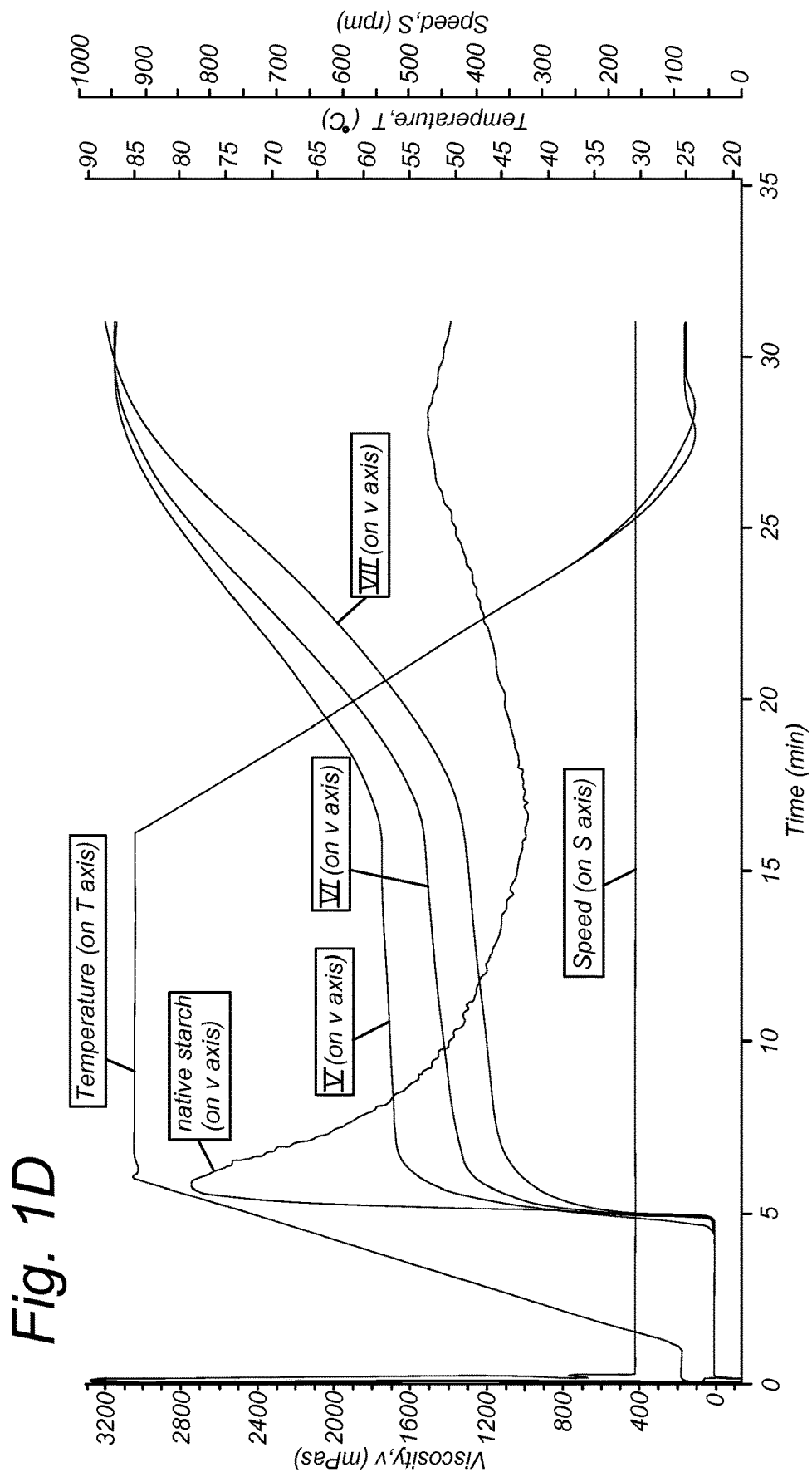

Example 2: Viscographs Under Neutral and Acid Conditions for Thermally Inhibited Non-Pregelatinized Granular Starch According to the Traditional Process and the Process According to the Invention FIG. 1 shows viscographs for thermally inhibited non-pregelatinized granular starch samples with an initial pH of 9, 10 and 11 and an initial moisture content of 10 wt %. FIG. 1a shows neutral Brabender viscographs for thermally inhibited non-pregelatinized granular starch according to the traditional process (obtained according to section 1.2) at a thermal treatment of 3 hours at 165° C. and FIGS. 1b-d show neutral RVA viscographs for non-pregelatinized granular native waxy potato starch [native starch (on v axis)] and thermally inhibited non-pregelatinized granular starch according to the process of the invention (described in section 1.3) at the following various hydrothermal treatment and/or thermal treatment conditions: FIG. 1b (samples at initial pH 11): hydrothermal treatment conditions to obtain hydrothermally treated non-pregelatinized granular starch of: 140° C. for 30 min [I (on v axis)]; 130° C. for 30 min [II (on v axis)] and 130° C. for 60 min [III (on v axis)], all thermal treatments were at 165° C. for 120 min; FIG. 1c (sample at initial pH 10): hydrothermal treatment conditions to obtain hydrothermally treated non-pregelatinized granular starch of: 130° C. for 30 min; thermal treatment at 165° C. for 120 min [IV (on v axis)]; FIG. 1d (samples at initial pH 9): hydrothermal treatment conditions to obtain hydrothermally treated non-pregelatinized granular starch of: 130° C. for 60 min, thermal treatment at 165° C. for 120 min [V (on v axis)]; hydrothermal treatment conditions to obtain hydrothermally treated non-pregelatinized granular starch of: 120° C. for 60 min, thermal treatment at 165° C. for 120 min [VI (on v axis)]; hydrothermal treatment conditions to obtain hydrothermally treated non-pregelatinized granular starch of: 130° C. for 60 min, thermal treatment at 165° C. for 180 min [VII (on v axis)]. Equilibrium steam pressure was used.

From FIG. 1a, it can be seen that with the traditional inhibition process for non-pregelatinized granular waxy potato starch viscostability under neutral conditions was not reached at an initial pH of the non-pregelatinized granular starch of 9 and 10. FIG. 1a shows that only the non-pregelatinized granular waxy potato starch sample at a high initial pH of 11 displayed viscostable behavior under neutral conditions, but this sample was thermally treated under harsh circumstances of 3 hours at 165° C. From FIGS. 1b-d, it can be seen that with the thermal inhibition process according to the invention for non-pregelatinized granular waxy potato starch viscostability under neutral conditions was also reached at lower initial pH values of the non-pregelatinized granular starch of 9, 10 and 11 and at all of the temperature, pressure and time conditions applied for hydrothermal and thermal treatment.

Figure 2A:
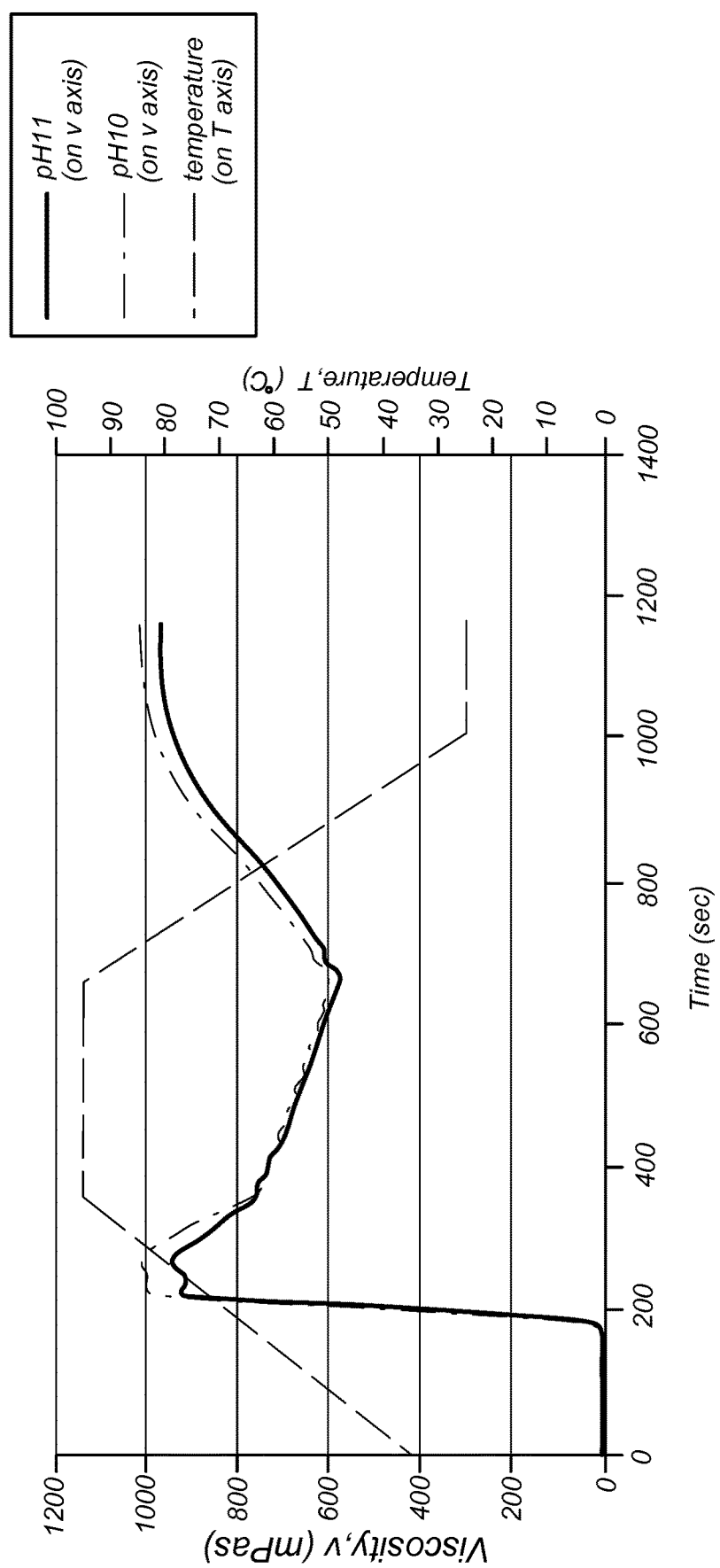
Figure 2B:
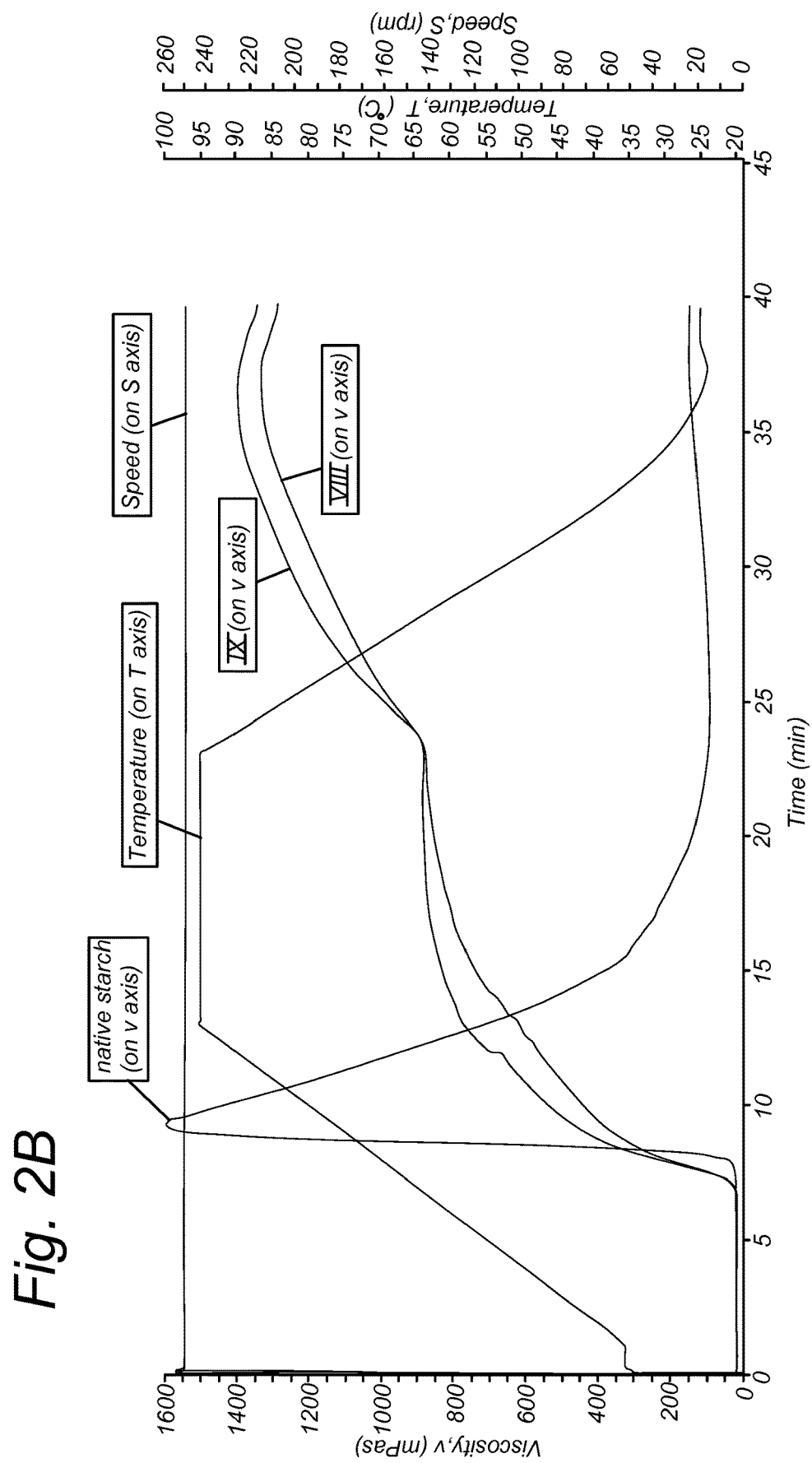

FIG. 2 shows viscographs of acid Brabender for thermally inhibited non-pregelatinized granular starch according to the traditional process described in section 1.2 (initial pH of 10 and 11, initial moisture of 10 wt %, 3 hours of thermal treatment at 165° C.) (FIG. 2a) and acid RVA viscographs for non-pregelatinized granular native waxy potato starch [native starch (on v axis)] and thermally inhibited non-pregelatinized granular starch according to the process of the invention described in section 1.3 (both samples at initial pH of 9, initial moisture content of 10 wt %, hydrothermal treatment conditions to obtain hydrothermally treated non-pregelatinized granular starch of 60 min at 120° C., one sample at thermal treatment of 120 min at 165° C. [VIII (on v axis)] and one sample at thermal treatment of 180 min at 165° C. [IX (on v axis)]. Equilibrium steam pressure was used.) (FIG. 2b).

In FIG. 2a, breakdown of viscosity under acid conditions is still visible for the non-pregelatinized granular starch samples that were thermally inhibited by the traditional process at initial pH of 10 and 11. Thus, for non-pregelatinized granular waxy potato starch with the traditional inhibition process viscostability under acid conditions was not reached at all, even not for the non-pregelatinized granular starch sample at initial pH of 11 which was viscostable under neutral conditions (FIG. 1a). In contrast, from FIG. 2b, it can be seen that with the thermal inhibition process according to the invention for non-pregelatinized granular waxy potato starch viscostability under acid conditions was in fact reached, also at low initial pH values of the non-pregelatinized granular starch of 9 and 10.

In summary, as can be seen from FIGS. 1 and 2, under both acid and neutral conditions, the non-pregelatinized granular starch obtained from the process of the invention achieved viscostability (i.e. 0% breakdown viscosity), also at low initial pH values of 9 and 10, while this was not the case for the non-pregelatinized granular starch from the traditional process.

Example 3: Holding Viscosity at Viscostability Under Acid and Neutral Conditions for Thermally Inhibited Non-Pregelatinized Granular Starch According to the Invention As determined from the RVA viscographs, the peak viscosity of non-pregelatinized granular native waxy potato starch was approximately 1600 mPa s under acid conditions and 2800 mPa s under neutral conditions.

The viscosities during the holding phase of the thermally inhibited non-pregelatinized granular waxy potato starch according to the invention were 850 mPa·s for acid RVA and 1700 mPa s for neutral RVA (as determined from said RVA viscographs of samples treated as described in section 1.3, under the conditions of: initial pH 9, initial moisture content of 10 wt % hydrothermal treatment to obtain hydrothermally treated non-pregelatinized granular starch at 120° C. for 60 min at equilibrium steam pressure; thermal treatment at 165° C. for 120 min). These holding viscosities were similar to the respective acid and neutral RVA peak viscosities of the thermally inhibited non-pregelatinized granular waxy potato starch according to the invention, meaning that under both acid and neutral conditions said starch had 0% breakdown viscosity.

For waxy potato starch, relative to the non-pregelatinized granular native starch, the thermally inhibited non-pregelatinized granular starch according to the invention retains (850/1600)*100%=53% of non-pregelatinized granular native starch peak viscosity, while also being viscostable (acid conditions) and (1700/2800)*100%=61% of non-pregelatinized granular native starch peak viscosity, while also being viscostable (neutral conditions). These viscosities during the holding phase and at viscostability are high for the waxy potato type of non-pregelatinized granular starch.

Thus under both acid and neutral conditions, the thermally inhibited non-pregelatinized granular starches according to the invention combine viscostability with a high viscosity during the holding phase (under neutral conditions at least 60% and under acid conditions at least 50% of the peak viscosity of the original non-pregelatinized granular native starch).

Figure 3A:
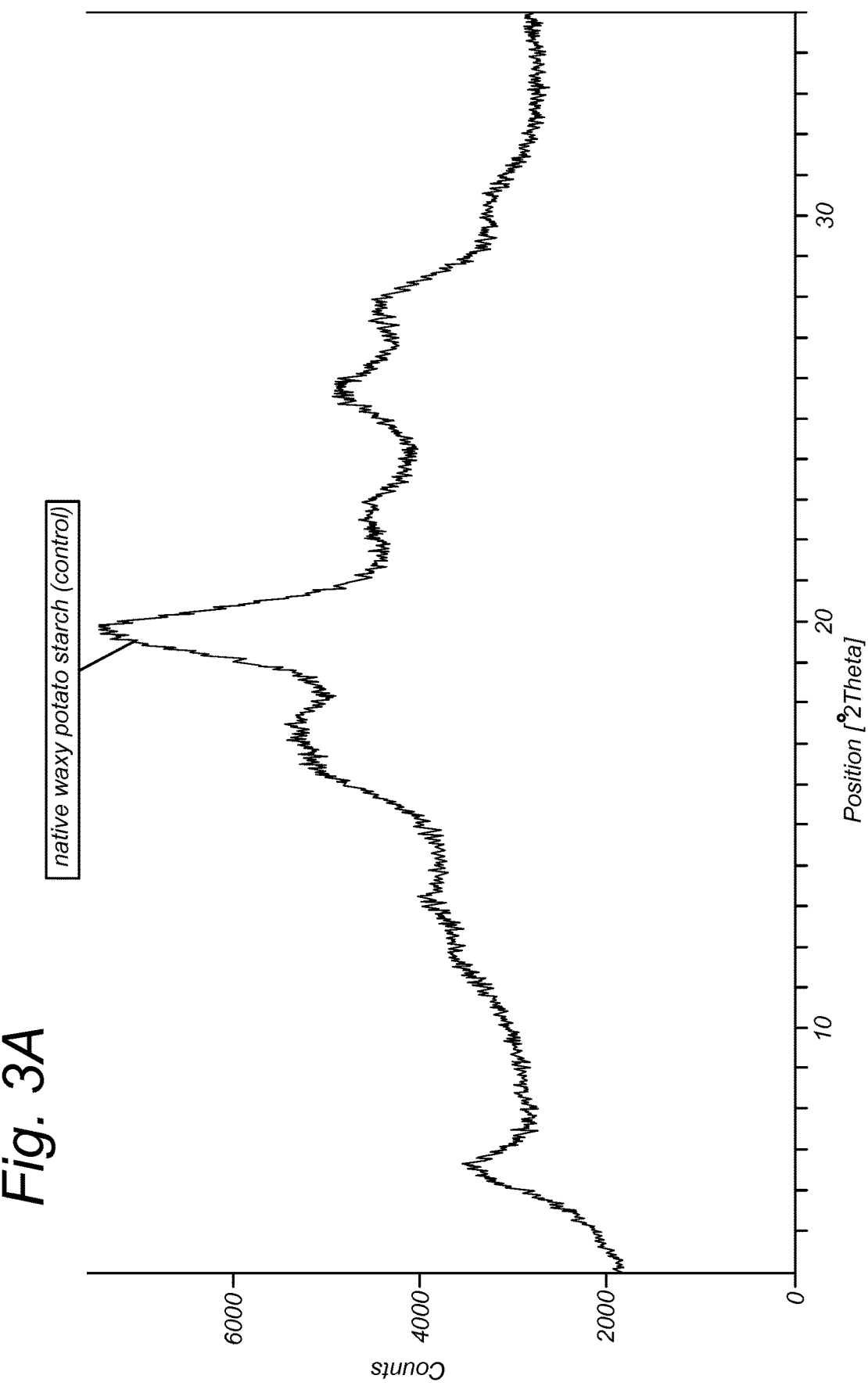
Figure 3B:
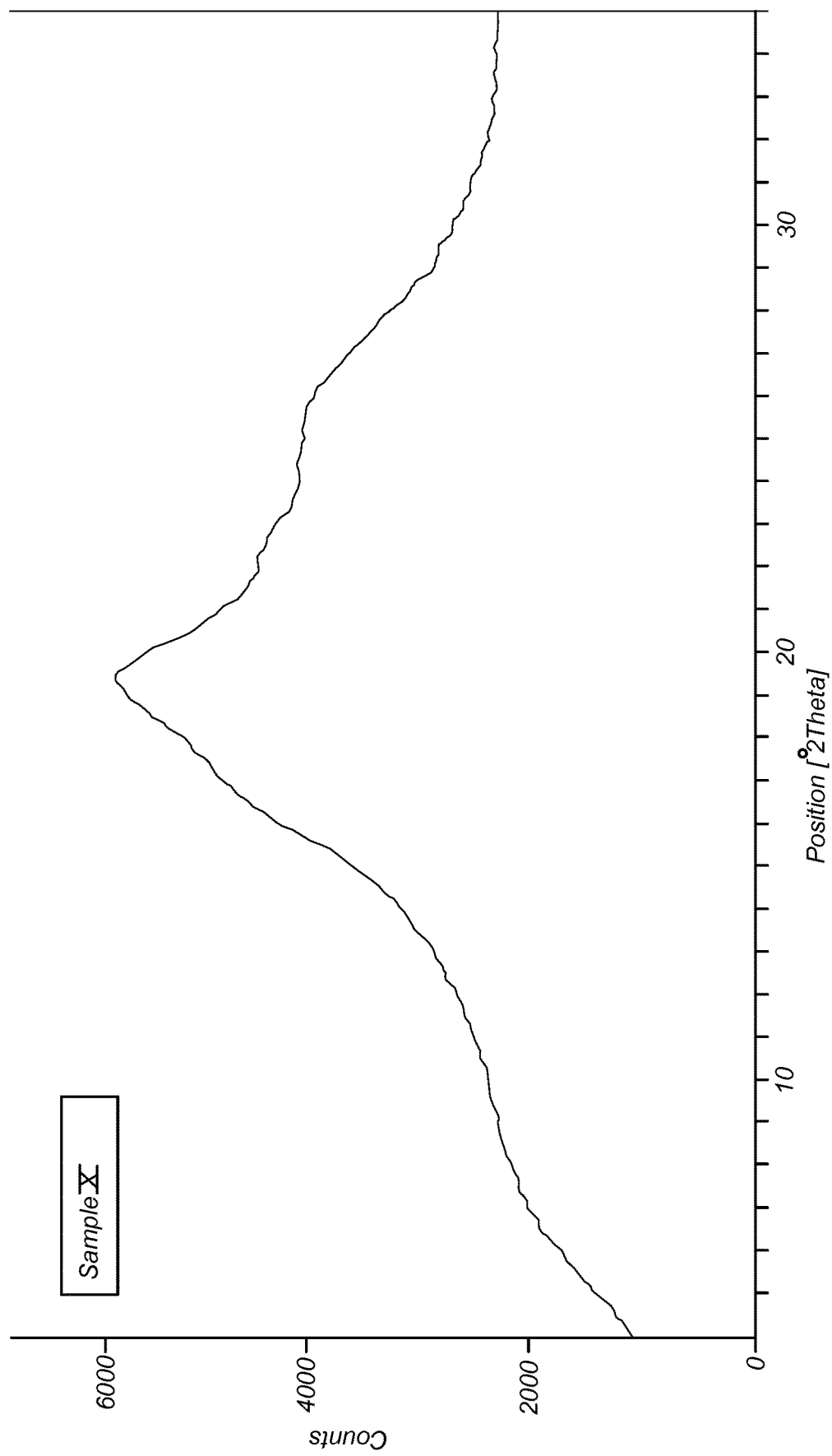

Example 4: X-Ray Analysis of Crystallinity of Non-Pregelatinized Granular Starch after Hydrothermal Treatment (i.e. Hydrothermally Treated Non-Pregelatinized Granular Starch) According to the Invention FIGS. 3a and 3b respectively show the XRD-graphs of non-pregelatinized granular native waxy potato starch (control) and non-pregelatinized granular waxy potato starch that has undergone hydrothermal treatment (i.e. hydrothermally treated non-pregelatinized granular starch) according to the invention as described in section 1.3 and under the conditions of: initial pH 9, initial moisture content 15 wt %; hydrothermal treatment to obtain hydrothermally treated non-pregelatinized granular starch at 120° C. for 60 min at equilibrium steam pressure [sample X].

As can be seen from FIG. 3, relative to the XRD spectrum of non-pregelatinized granular native waxy potato starch (that has not undergone hydrothermal treatment (i.e. non-hydrothermally treated non-pregelatinized granular starch)), the XRD spectrum of non-pregelatinized granular waxy potato starch sample that has been subjected to hydrothermal treatment (i.e. hydrothermally treated non-pregelatinized granular starch) according to the invention contains a smaller amount of peaks, the peaks are broadened and the highest peak is at a lower value, meaning that it has lost part of its crystallinity. It is thus believed that hydrothermal treatment to obtain hydrothermally treated non-pregelatinized granular starch decreases the crystallinity of the (non-pregelatinized granular) starch, which the inventors believe increases the effectiveness of the base in the mechanism of inhibition, hence enabling the usage of lower amounts of base and lower pH than the traditional inhibition process which further results in a better control of the process conditions and in a reduction in color formation as shown in Example 6.

Example 5: Differential Scanning Calorimetry (DSC) Analysis of Non-Pregelatinized Granular Starch After Hydrothermal Treatment (i.e. Hydrothermally Treated Non-Pregelatinized Granular Starch) According to the Invention It was found that non-pregelatinized granular native waxy potato starch (that has not undergone hydrothermal treatment (i.e. non-hydrothermally treated non-pregelatinized granular starch)) had an onset temperature of 66° C., while non-pregelatinized granular waxy potato starch that had been subjected to hydrothermal treatment to obtain hydrothermally treated non-pregelatinized granular starch according to the invention under conditions described in section 1.3 had onset temperatures of 59° C. (at initial pH 9, 10 and 11, initial moisture of 10 wt %, all at 30 and 60 min of hydrothermal treatment to obtain hydrothermally treated non-pregelatinized granular starch at 120 or 130° C. and equilibrium steam pressure). Hydrothermal treatment to obtain hydrothermally treated non-pregelatinized granular starch thus decreases the onset temperature of the non-pregelatinized granular starch. The onset temperature relates to the amount of charred particles present in the starch. Since the presence of charred particles decreases the whiteness of the starch, the onset temperature also relates to the amount of colorization of the starch. The observed decrease in onset temperature in the hydrothermally treated non-pregelatinized granular starch due to hydrothermal treatment of the non-pregelatinized granular starch relative to non-pregelatinized granular native starch thus means that the amount of charred particles and amount of colorization of the treated non-pregelatinized granular starch according to the invention also decreases relative to non-pregelatinized granular native starch. This is another reason why hydrothermal treatment to obtain hydrothermally treated non-pregelatinized granular starch is important for obtaining starch with improved whiteness.

Example 6: Color Analysis of the Thermally Inhibited Non-Pregelatinized Granular Starch According to the Invention Waxy potato starch (a non-pregelatinized granular starch) that had been thermally inhibited (to form a thermally inhibited non-pregelatinized granular starch) by the process according to the invention (described in section 1.3: initial water content of 10 wt %, hydrothermal treatment to obtain hydrothermally treated non-pregelatinized granular starch at 120° C. and equilibrium steam pressure for 60 min, fast dehydration of the hydrothermally treated non-pregelatinized granular starch, at 165° C. and thermal treatment at 165° C. for 120 min) and reached viscostability, had an L value of 90 when the initial pH was 8, an L value of 88 when the initial pH was 9, L value of 84 when the initial pH was 10, and an L value of 80 when the initial pH was 11.

This shows that in the process according to the invention, at lower initial pH values, higher degrees of whiteness (higher L values) may be achieved in combination with viscostability.

The invention claimed is:

1. A process for producing thermally inhibited, non-pregelatinized granular starch comprising:
   (i) obtaining an alkaline non-pregelatinized granular starch having a pH of at least 7.2;
   (ii) subjecting the starch to a hydrothermal treatment to obtain a hydrothermally treated non-pregelatinized granular starch, the hydrothermal treatment being at a temperature of 100-170° C. with:
      steam at a steam pressure of 0.1-15 bar, where:
         at a given temperature T, the steam pressure is 0.3 bar above equilibrium steam pressure p(e), at the p(e) or below the p(e); or
         at a given steam pressure p, the temperature is 10° C. below dew point or vaporization point T(e), at the T(e) or above the T(e); or
      a gas mixture comprising water vapor at a partial water vapor pressure of 0.1-15 bar, where:
         at a given temperature T, the partial water vapor pressure is 0.3 bar above equilibrium partial water vapor pressure p(e), at the p(e) or below the p(e); or
         at a given partial water vapor pressure p, the temperature is 10° C. below dew point or vaporization point T(e), at the T(e) or above the T(e);
   (iii) dehydrating the hydrothermally treated non-pregelatinized granular starch to a moisture content of 2 wt % or lower and subjecting the starch to a thermal treatment by heating the starch to a temperature of 120-190° C., to obtain viscostability; and
   (iv) cooling and optionally further processing the starch.

2. The process according to claim 1, wherein the hydrothermally treated non-pregelatinized granular starch resulting from step (ii) is dehydrated to a moisture content of 1.5 wt % or lower.

3. The process according to claim 1, wherein the alkaline non-pregelatinized granular starch provided in step (i) has a pH of 8-11.

4. The process according to claim 1, wherein the starch subjected to the hydrothermal treatment has an initial moisture content of 30 wt % or lower.

5. The process according to claim 4, wherein the starch subjected to the hydrothermal treatment has an initial moisture content between 30 wt % and 2 wt %.

6. The process according to claim 1, wherein the hydrothermal treatment is conducted at a temperature of 105-155° C.

7. The process according to claim 1, wherein the hydrothermal treatment is conducted at a steam pressure or partial water vapor pressure p of 0.5-7 bar.

8. The process according to claim 1, wherein the hydrothermal treatment is conducted for 5-180 minutes.

9. The process according to claim 1, wherein the hydrothermal treatment is conducted with superheated or saturated steam.

10. The process according to claim 1, wherein the thermal treatment in step (iii) is conducted at a temperature of 130-190° C. for a period of 1-4 hours.

11. The process according to claim 9, wherein the thermal treatment in step (iii) is conducted at a temperature of 140-185° C. for a period of 1-3 hours.

12. The process according to claim 1, wherein the non-pregelatinized granular starch is a non-pregelatinized granular starch or non-pregelatinized granular starch-containing product selected from the group consisting of maize or corn starch, rice starch, wheat starch, tapioca starch and/or potato starch.

13. The process according to claim 11, wherein the non-pregelatinized granular starch is a root and/or tuber starch, optionally a waxy root and/or waxy tuber starch.

* * * * *